United States Patent
Nagle

(10) Patent No.: US 7,182,380 B2
(45) Date of Patent: Feb. 27, 2007

(54) TAILGATE EXTENDER SYSTEMS

(76) Inventor: Rick A. Nagle, 1516 W. Hononegh Dr., Phoenix, AZ (US) 85027

( * ) Notice: Subject to any disclaimer, the term of this patent is extended or adjusted under 35 U.S.C. 154(b) by 0 days.

(21) Appl. No.: 11/361,219

(22) Filed: Feb. 23, 2006

(65) Prior Publication Data

US 2006/0186685 A1 Aug. 24, 2006

Related U.S. Application Data

(60) Provisional application No. 60/656,314, filed on Feb. 24, 2005, provisional application No. 60/713,950, filed on Sep. 1, 2005.

(51) Int. Cl.
*B60P 3/34* (2006.01)
(52) U.S. Cl. .................... 296/26.11; 296/57.1
(58) Field of Classification Search ............. 296/26.11, 296/26.08, 57.1
See application file for complete search history.

(56) References Cited

U.S. PATENT DOCUMENTS

| | | | |
|---|---|---|---|
| 4,864,673 A | | 9/1989 | Adaway et al. |
| 5,244,335 A | | 9/1993 | Johns |
| 5,468,038 A | * | 11/1995 | Sauri ..................... 296/26.11 |
| 5,597,195 A | | 1/1997 | Meek |
| 5,741,039 A | * | 4/1998 | Habdas ................... 296/26.11 |
| 5,775,759 A | * | 7/1998 | Cummins ................ 296/26.11 |
| 5,788,311 A | * | 8/1998 | Tibbals ................... 296/26.11 |
| 5,803,523 A | | 9/1998 | Clark et al. |
| 5,988,725 A | | 11/1999 | Cole |
| 6,007,127 A | | 12/1999 | Garofalo |
| 6,045,172 A | | 4/2000 | Thomas et al. |
| 6,082,801 A | * | 7/2000 | Owen et al. ............. 296/26.11 |
| 6,149,219 A | | 11/2000 | Schambre et al. |
| 6,340,190 B1 | * | 1/2002 | Rosebrugh et al. ...... 296/26.11 |
| 6,364,391 B1 | * | 4/2002 | Everett ..................... 296/57.1 |
| 6,364,392 B1 | * | 4/2002 | Meinke .................... 296/57.1 |
| 6,454,338 B1 | * | 9/2002 | Glickman et al. ......... 296/57.1 |
| 6,484,344 B1 | | 11/2002 | Cooper |
| 6,550,841 B1 | | 4/2003 | Burdon et al. |
| 6,634,689 B1 | | 10/2003 | Soto |
| 6,698,810 B1 | * | 3/2004 | Lane ........................ 296/57.1 |
| 6,712,568 B2 | * | 3/2004 | Snyder et al. ............. 410/104 |
| 6,908,134 B1 | * | 6/2005 | Summers ................. 296/26.11 |
| 6,918,624 B2 | * | 7/2005 | Miller et al. .............. 296/26.1 |
| 6,932,404 B2 | * | 8/2005 | Vejnar ...................... 296/57.1 |
| 6,935,671 B2 | * | 8/2005 | Bruford et al. ............ 296/57.1 |
| 6,983,972 B2 | * | 1/2006 | Tan et al. .................. 296/57.1 |
| 6,988,756 B1 | * | 1/2006 | Meinke et al. .......... 296/26.08 |
| 6,991,277 B1 | * | 1/2006 | Esler ....................... 296/26.08 |
| 6,994,363 B2 | * | 2/2006 | Seksaria et al. ........... 296/26.1 |
| 2002/0121794 A1 | | 9/2002 | Vejnar |
| 2004/0219004 A1 | | 11/2004 | Huggins |
| 2004/0227368 A1 | | 11/2004 | Seksaria et al. |
| 2006/0145505 A1 | * | 7/2006 | Masterton .................. 296/57.1 |

\* cited by examiner

*Primary Examiner*—Kiran B. Patel
(74) *Attorney, Agent, or Firm*—Stoneman Volk Patent Group; Martin L. Stoneman

(57) ABSTRACT

A tailgate extender system is provided having telescoping supports, which stores entirely within a storage compartment in the tailgate, and which extends directly perpendicular to the tailgate surface for use. The telescoping supports are hingedly connected to the tailgate within the storage compartment and are slidingly connected to the top rail of the tailgate extender. Further, a cargo netting system that retracts into the tailgate extender top rail is provided.

21 Claims, 30 Drawing Sheets

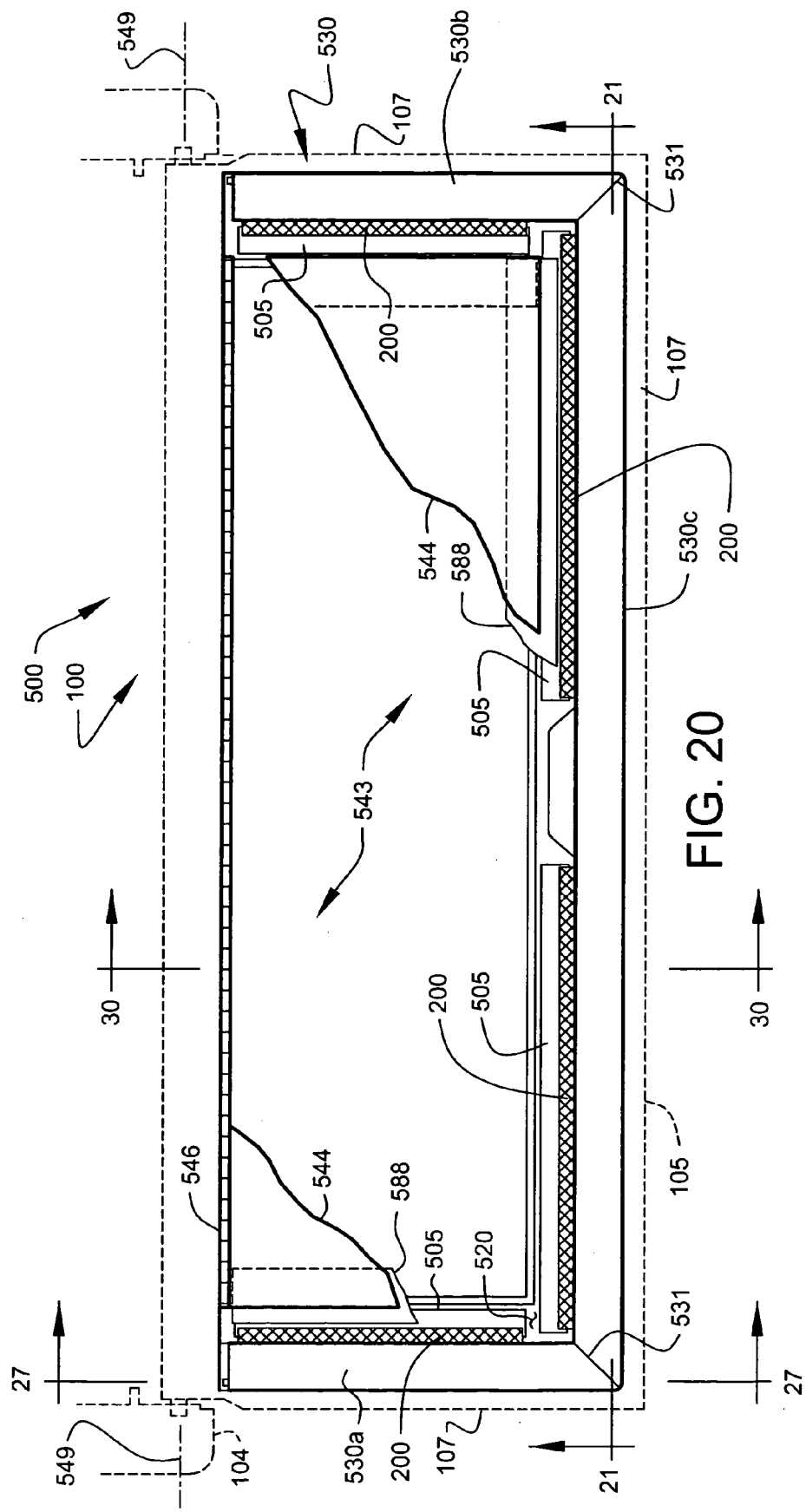

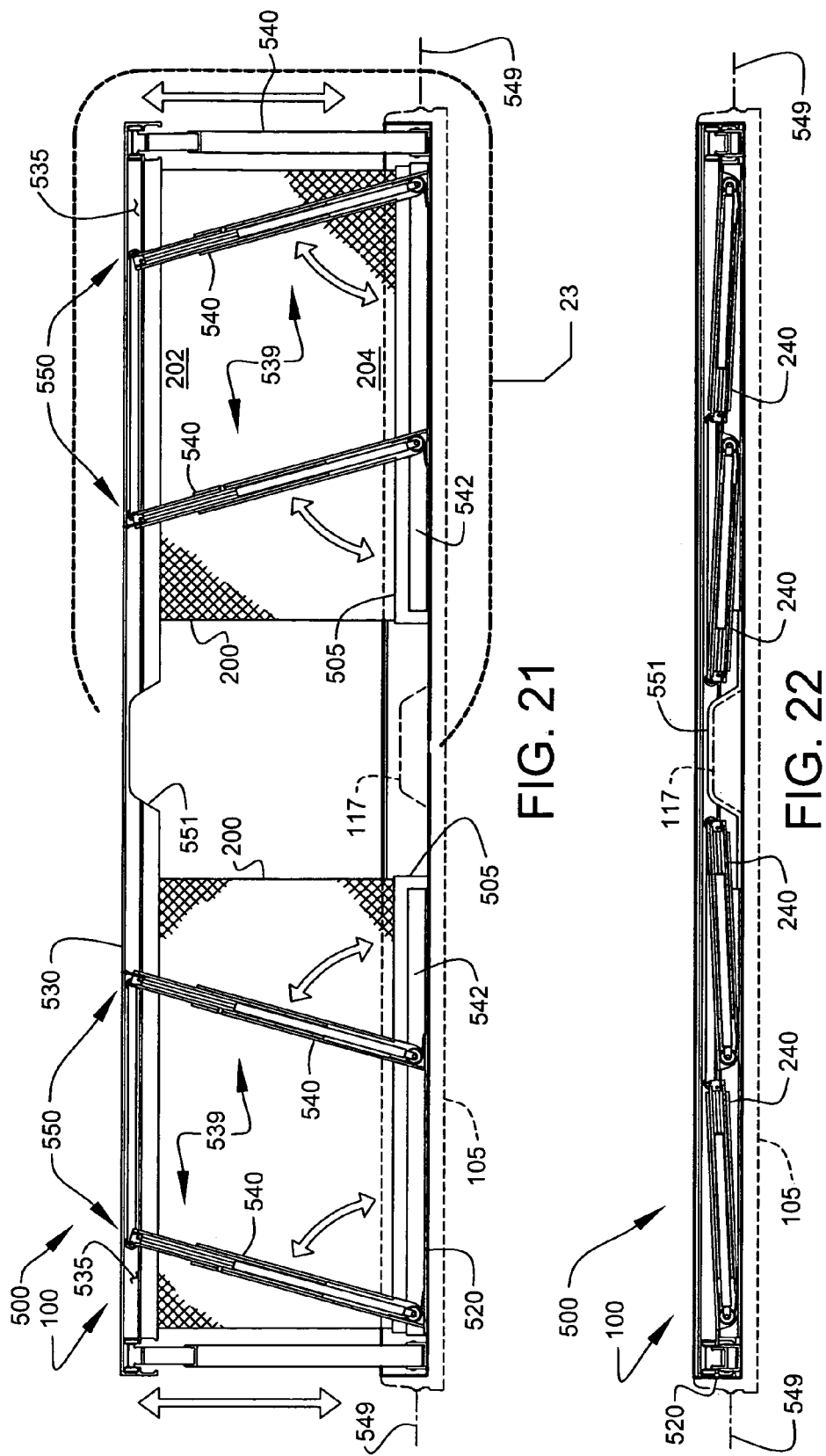

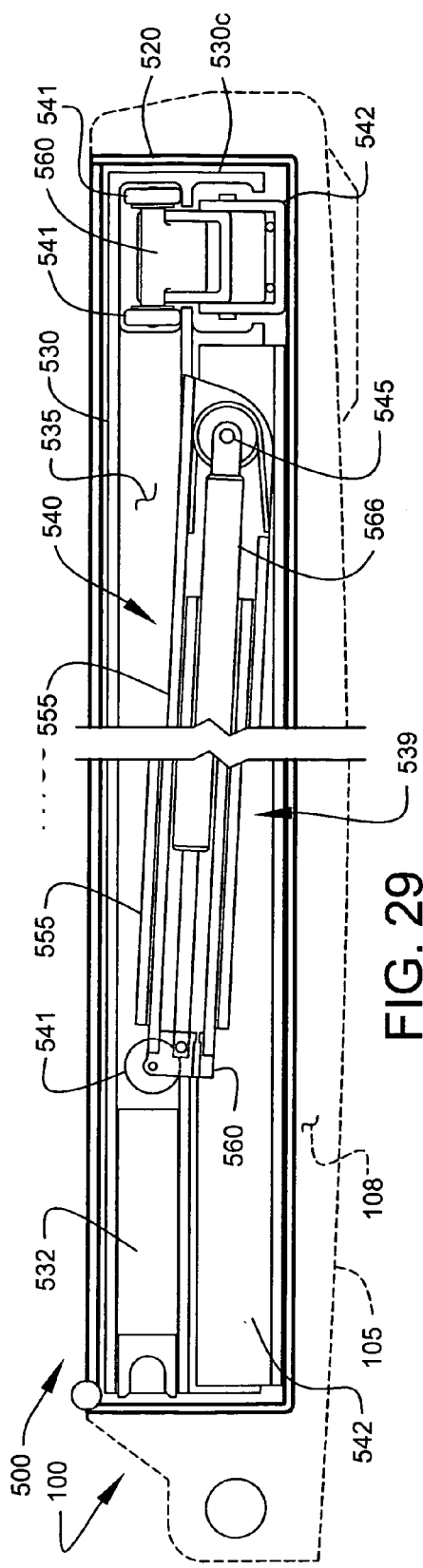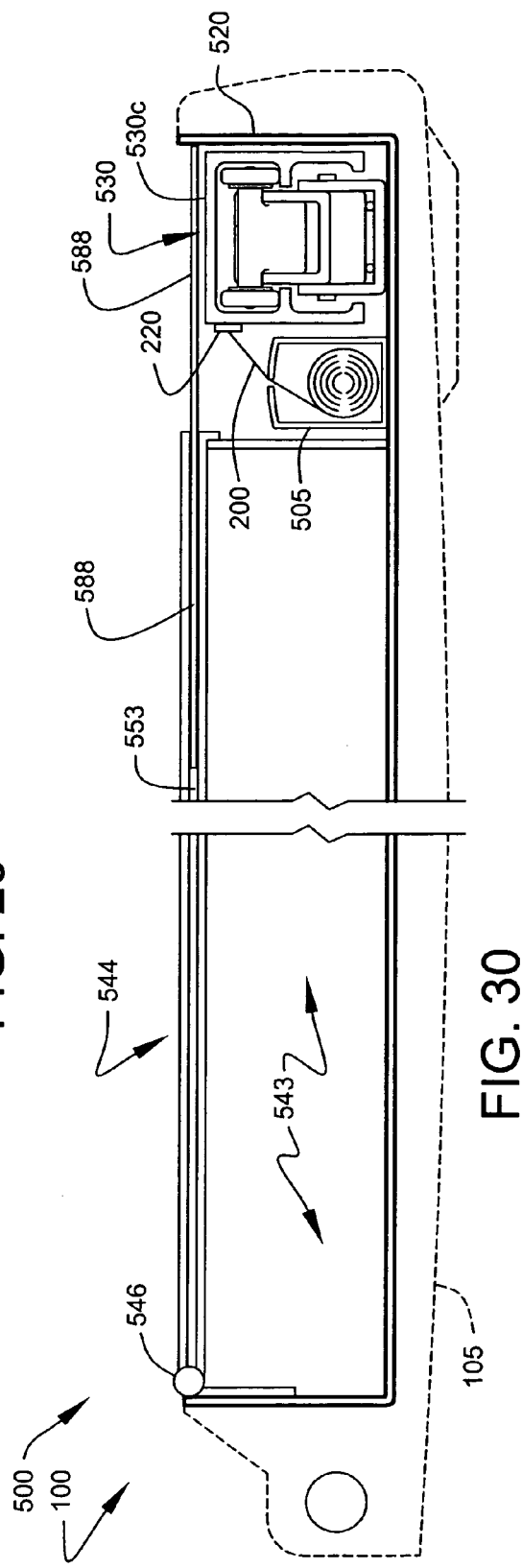

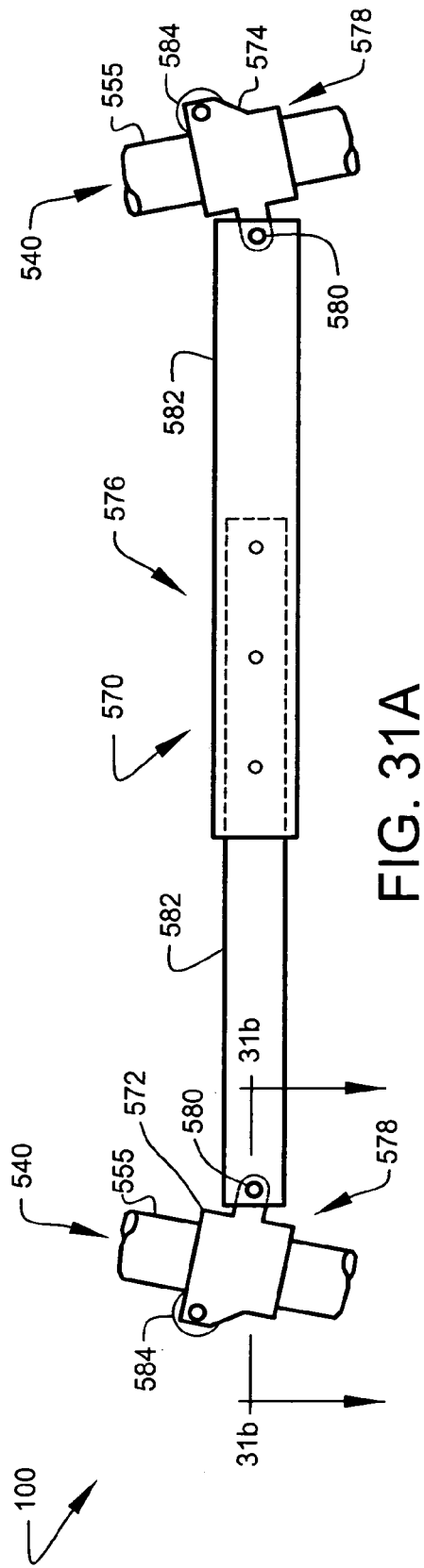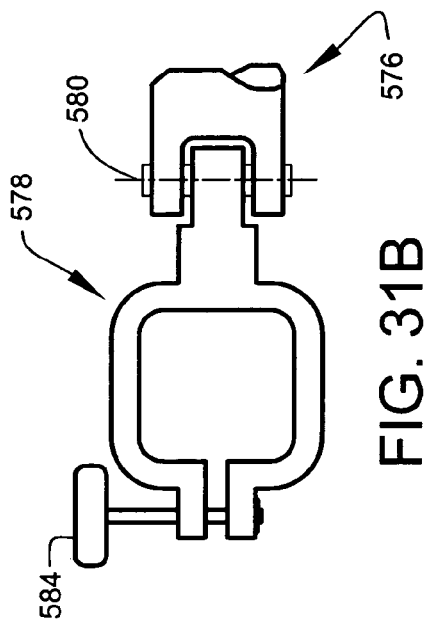
FIG. 31A
FIG. 31B

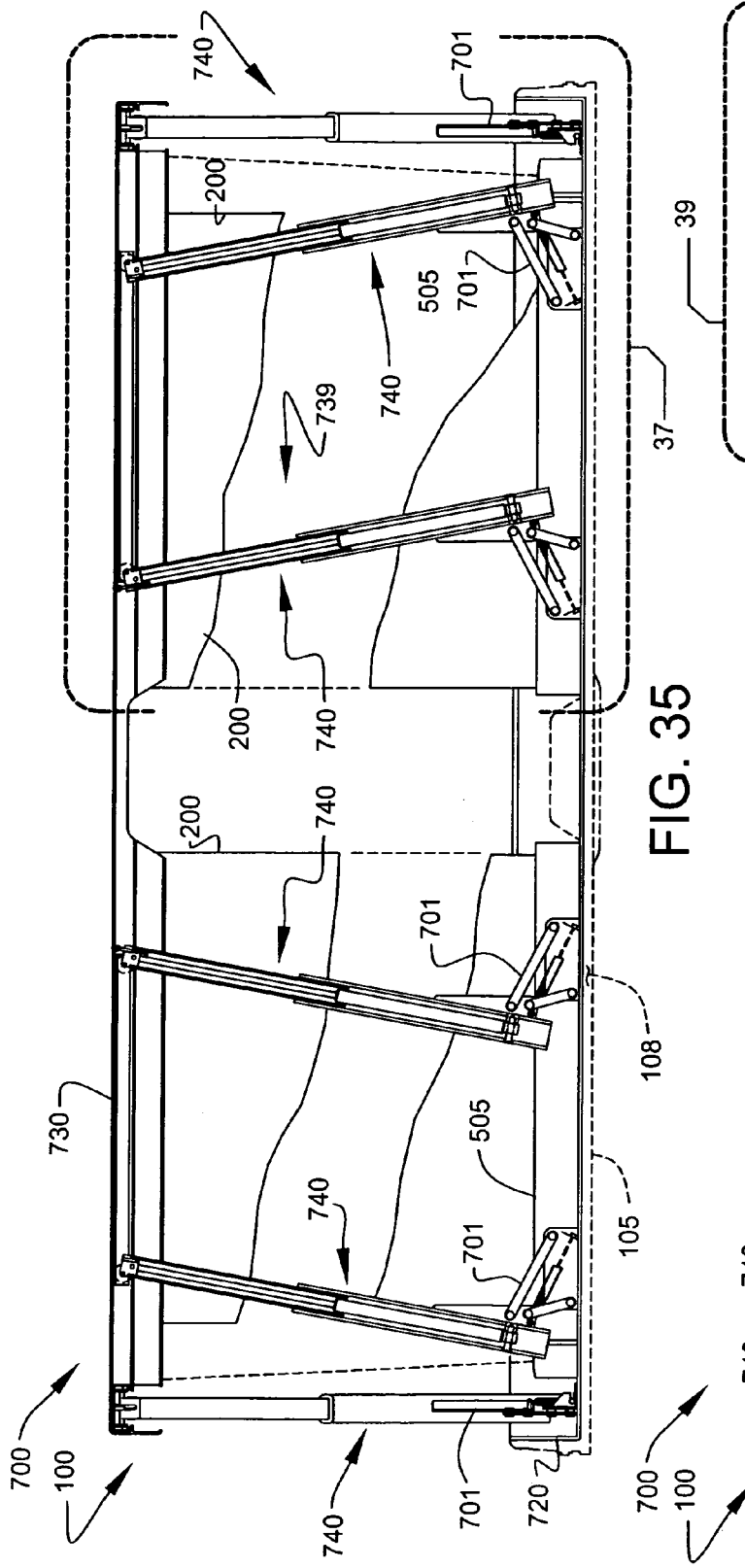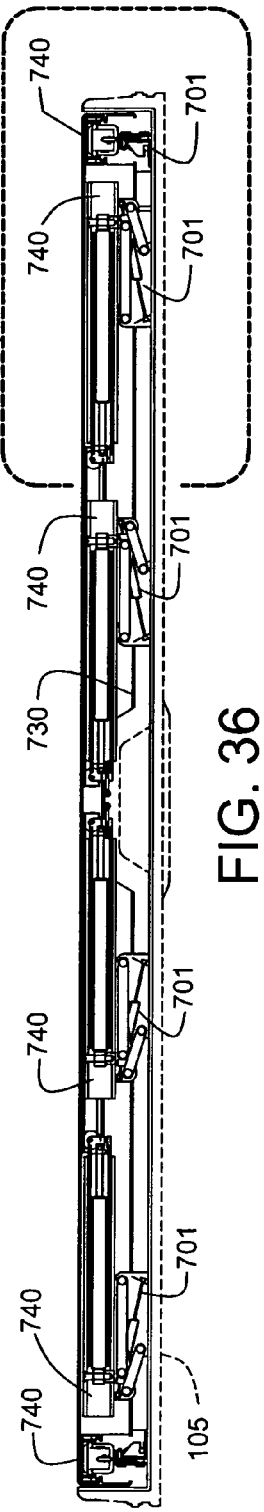
FIG. 35
FIG. 36

TAILGATE EXTENDER SYSTEMS

CROSS-REFERENCE TO RELATED APPLICATION

The present application is related to and claims priority from prior provisional application Ser. No. 60/656,314, filed Feb. 24, 2005, entitled "TAILGATE EXTENDER SYSTEMS", and is related to and claims priority from prior provisional application Ser. No. 60/713,950, filed Sep. 01, 2005, entitled "TAILGATE EXTENDER SYSTEMS", the contents of both of which are incorporated herein by this reference and are not admitted to be prior art with respect to the present invention by the mention in this cross-reference section.

BACKGROUND

This invention relates to providing improved tailgate extender systems. More particularly, this invention relates to providing improved tailgate extender systems which are stored within the tailgate, and which rise perpendicularly from below the interior surface of the tailgate.

Typically, persons needing to extend temporarily the length of their truck bed lower their tailgate and install a tailgate extender barrier to keep the cargo from sliding past the end of the tailgate. Such temporary tailgate extenders are typically attached to the existing tailgate, requiring multiple set-up steps. Further, such tailgate extenders take up truck bed space when they are not in use.

Therefore, a need exists for a tailgate extender that does not take up truck bed space when the tailgate extender is not in use. Further, a need exists for a tailgate extender that is quick and easy to set up and store.

OBJECTS AND FEATURES OF THE INVENTION

A primary object and feature of the present invention is to solve the above-mentioned problems and meet the above-listed needs. A further primary object and feature of the present invention is to provide tailgate extender systems.

It is a further object and feature of the present invention to provide such a system that is stored within a tailgate. It is another object and feature of the present invention to provide such a system that rises substantially perpendicularly to the inside surface of a tailgate.

It is yet another object and feature of the present invention to provide such a system having multiple telescoping supports. It is a further object and feature of the present invention to provide such a system having retractable cargo netting. In addition, it is an object and feature of the present invention to provide such a system that is mountable to exterior surface of a tailgate.

A further primary object and feature of the present invention is to provide such a system that is efficient, inexpensive, and handy. Other objects and features of this invention will become apparent with reference to the following descriptions.

SUMMARY OF THE INVENTION

In accordance with a preferred embodiment hereof, this invention provides a truck tailgate extender system, comprising: tailgate means for providing at least one tailgate, having at least one inner surface and at least one outer surface, adapted to be hingedly connected to at least one truck bed; and barrier means for assisting barring cargo from crossing at least one distal perimeter of such tailgate means when such tailgate means is connected to the at least one truck bed and lowered; wherein such tailgate means comprises storage means for storing such barrier means when not in use; wherein such storage means is located substantially between such at least one inner surface and at least one outer surface of such tailgate means; and wherein such barrier means comprises extender means for extending such barrier means substantially perpendicularly from such at least one inner surface.

Moreover, it provides such a truck tailgate extender system, wherein such barrier means comprises: rail means for railing; extendable support means for extendably supporting such rail means; first connector means for connecting such extendable support means to such tailgate means; and second connector means for connecting such extendable support means to such rail means.

In accordance with another preferred embodiment hereof, this invention provides a truck tailgate extender system, comprising: at least one tailgate, having at least one inner surface and at least one outer surface, adapted to be hingedly connected to at least one truck bed; and at least one barrier adapted to assist barring cargo from crossing at least one rear perimeter of such at least one tailgate when such at least one tailgate is connected to the at least one truck bed and lowered; wherein such at least one tailgate comprises at least one storage compartment adapted to store such at least one barrier when not in use; wherein such at least one storage compartment is located substantially between such at least one inner surface and such at least one outer surface of such at least one tailgate; and wherein such at least one barrier comprises at least one extender adapted to extend such at least one barrier substantially perpendicularly through such at least one inner surface, wherein at least one extended barrier portion may be formed.

Additionally, it provides such a truck tailgate extender system further comprising at least one gap closer adapted to close at least one gap between such at least one extended barrier portion and such at least one truck bed. Also, it provides such a truck tailgate extender system wherein such at least one gap closer is retractably extendable from such at least one barrier. In addition, it provides such a truck tailgate extender system further comprising at least one cover adapted to cover such at least one storage compartment. And, it provides such a truck tailgate extender system wherein such at least one cover is retractably storable within such at least one at least one tailgate.

Further, it provides such a truck tailgate extender system further comprising at least one flexible barrier adapted to assist flexibly barring cargo from passing through such at least one barrier. Even further, it provides such a truck tailgate extender system wherein such at least one flexible barrier is adapted to be stored within such at least one barrier. Moreover, it provides such a truck tailgate extender system wherein such at least one flexible barrier is adapted to be stored within such at least one storage compartment. Additionally, it provides such a truck tailgate extender system wherein such at least one barrier comprises: at least one rail adapted to substantially horizontally rail such at least one rear perimeter of such at least one tailgate when such at least one tailgate is connected to such at least one truck bed and lowered; and at least one extendable support adapted to extendably vertically support such at least one rail; at least one first connector adapted to connect such at least one extendable support to such at least one tailgate; and at least one second connector adapted to connect such at least one extendable support to such at least one rail.

Also, it provides such a truck tailgate extender system wherein such at least one first connector comprises at least one hinge. In addition, it provides such a truck tailgate extender system wherein such at least one second connector comprises: at least one channel within such at least one rail; and at least one slider adapted to slide such at least one extendable support within such at least one channel. And, it provides such a truck tailgate extender system wherein such extendable support means comprises at least one telescoping bar.

In accordance with another preferred embodiment hereof, this invention provides a truck tailgate extender system comprising: at least one tailgate, having at least one inner surface and at least one outer surface, adapted to be hingedly connected to at least one truck bed; and at least one rigid barrier adapted to assist rigidly barring cargo from crossing at least one distal perimeter of such at least one tailgate when such at least one tailgate is connected to the at least one truck bed and lowered; and at least one flexible restraint adapted to assist flexibly restraining cargo; wherein such at least one rigid barrier comprises at least one retractor adapted to retract such at least one flexible restraint for storage. Further, it provides such a truck tailgate extender system wherein such at least one retractor is located within such at least one rigid barrier.

In accordance with another preferred embodiment hereof, this invention provides a truck tailgate extender system relating to at least one tailgate having at least one inner surface comprising the steps of: lowering such at least one tailgate; and extending at least one barrier from substantially within such at least one tailgate, through such at least one inner surface, and substantially perpendicular to such at least one inner surface. Even further, it provides such a truck tailgate extender system, further comprising the step of releasably locking such at least one barrier in at least one extended position. Moreover, it provides such a truck tailgate extender system, further comprising the step of extending at least one flexible barrier from substantially within such at least one extended barrier to such at least one inner surface of such at least one tailgate. Additionally, it provides such a truck tailgate extender system, further comprising the step of lowering such at least one barrier substantially perpendicular to such at least one inner surface, through such at least one inner surface, and substantially into such at least one tailgate.

In accordance with another preferred embodiment hereof, this invention provides a truck tailgate extender system related to extending at least one tailgate, adapted to be hingedly connected to at least one truck bed, having at least one inner cavity, at least one perimeter edge, and when in at least one lowered configuration, at least one substantially planar top surface, such truck tailgate extender system comprising: at least one barrier adapted to assist barring cargo from crossing the at least one perimeter edge; at least one first storage section adapted to assist storage of such at least one barrier, in at least one stowed position; at least one conveyer adapted to convey such at least one barrier between such at least one stowed position and at least one deployed position; wherein such at least one conveyer is structured and arranged to translate such at least one barrier along at least one path substantially perpendicular to the at least one substantially planar top wherein such at least one first storage section is mountable to the at least one tailgate; and wherein such at least one barrier, while in such at least one deployed position, assists barring cargo from crossing the at least one perimeter edge when the at least one tailgate is in the at least one lowered configuration.

Also, it provides such a truck tailgate extender system, further comprising at least one second storage section adapted to store at least one storable object. In addition, it provides such a truck tailgate extender system, further comprising at least one cover adapted to cover such at least one second storage section. And, it provides such a truck tailgate extender system, wherein: such at least one cover comprises at least one extendable cover portion adapted to cover such at least one first storage section; and such at least one extendable cover portion is retractably storable within such at least one cover. Further, it provides such a truck tailgate extender system, further comprising at least one flexible barrier adapted to assist in flexibly barring cargo from moving past such at least one barrier.

Even further, it provides such a truck tailgate extender system, wherein: such at least one flexible barrier comprises at least one retractor adapted to retract such at least one flexible barrier for storage; and such at least one flexible barrier is adapted to be stored within such at least one first storage section. Moreover, it provides such a truck tailgate extender system, wherein: such at least one barrier comprises at least one boundary rail adapted to bound such at least one perimeter edge of such at least one tailgate; such at least one boundary rail comprises at least one substantially linear interior channel; such at least one conveyer comprises at least one extendable support adapted to extendably support such at least one boundary rail; such at least one extendable support comprises at least one first connector adapted to pivotally connect such at least one extendable support to such at least one first storage section; and such at least one extendable support further comprises at least one second connector adapted to pivotally connect such at least one extendable support to such at least one boundary rail.

Additionally, it provides such a truck tailgate extender system, wherein such at least one first connector comprises at least one rotator adapted to rotate such at least one extendable support about such at least one first connector. Also, it provides such a truck tailgate extender system, wherein: such at least one rotator comprises at least one torque generator adapted to generate at least one torque force; such at least one rotator is structured and arranged to apply such at least one torque force to such at least one extendable support; and application of such at least one torque force biases such at least one extendable support toward at least one rotation about such at least one first connector. In addition, it provides such a truck tailgate extender system, wherein such at least one rotator comprises at least one spring.

And, it provides such a truck tailgate extender system, wherein such at least one second connector comprises at least one slider adapted to slide within such at least one substantially linear interior channel of such at least one boundary rail. Further, it provides such a truck tailgate extender system, wherein such at least one slider comprises at least one friction reducer adapted to assist in reducing friction between such at least one substantially linear interior channel and such at least one slider.

Even further, it provides such a truck tailgate extender system, wherein such at least one friction reducer comprises at least one wheel. Moreover, it provides such a truck tailgate extender system, wherein: such at least one conveyer further comprises at least one positional fixer adapted to fix the position of such at least one slider relative to such at least one boundary rail; and such at least one positional fixer is user releasable. Additionally, it provides such a truck tailgate extender system, wherein such at least one positional fixer comprises: within such at least one slider, at least one spring-biased wheel adapted to roll in contact with such at least one substantially linear interior channel; within such at least one substantially linear interior channel, at least one receiver adapted to receive and retain such at least one spring-biased wheel; and at least one release adapted to release such at least one spring biased wheel from such retention by such at least one receiver. Also, it provides such a truck tailgate extender system, wherein such extendable support means comprises at least one telescoping bar adapted to telescopically adjust the linear distance between such at least one first connector and such at least one second connector.

In addition, it provides such a truck tailgate extender system, wherein such at least one telescoping bar comprises at least one releasable lock adapted to releasably lock such at least one telescoping bar in at least one telescopic position. And, it provides such a truck tailgate extender system, wherein such extendable support means further comprises at least one telescopic assister adapted to assist telescopic adjustment of such at least one telescoping bar.

Further, it provides such a truck tailgate extender system, wherein such at least one telescopic assister comprises at least one gas-charged spring. Even further, it provides such a truck tailgate extender system, wherein such at least one gas-charged spring is disposed substantially within such at least one telescoping bar. Even further, it provides such a truck tailgate extender system, wherein: such at least one conveyer comprises at least one first such at least one extendable support and at least one second at least one extendable support; such at least one conveyer comprises at least one coordinator adapted to coordinates the operation of such at least one first such at least one extendable support and such at least one second at least one extendable support; and such at least one coordinator comprises at least one link adapted to link each such at least one slider of such at least one first such at least one extendable support and such at least one second at least one extendable support.

Even further, it provides such a truck tailgate extender system, wherein such at least one first connector comprises at least one open channel adapted to substantially receive such at least one extendable support. Moreover, it provides such a truck tailgate extender system, further comprising: at least one cargo management bar adapted to manage the storage and transport of such cargo within the at least one truck bed; wherein such at least one cargo management bar comprises at least one first bar coupler adapted to couple such at least one cargo management bar to at least one first such at least one extendable support, at least one second bar coupler adapted to couple such at least one cargo management bar to at least one second such at least one extendable support, and at least one link adapted to link such at least one first bar coupler and such at least one second bar coupler; wherein such at least one link is adapted to assist positioning of such at least one cargo during such storage and transport.

Even further, it provides such a truck tailgate extender system, further comprising at least one gap closer adapted to close at least one gap between such at least one boundary rail and such at least one truck bed. Even further, it provides such a truck tailgate extender system, wherein such at least one gap closer is retractably extendable from such at least one boundary rail. Even further, it provides such a truck tailgate extender system, wherein such at least one storage section is located substantially within the at least one inner cavity of the at least one tailgate.

Yet further, it provides such a truck tailgate extender system, wherein such at least one storage compartment is located substantially external of the at least one inner cavity of the at least one tailgate. Even further, it provides such a truck tailgate extender system, wherein such at least one extendable support comprises at least one scissor assembly adapted to assist translation of such at least one barrier between such at least one stowed position and at least one deployed position. Even further, it provides such a truck tailgate extender system, wherein such at least one extendable support comprises: at least one first support arm adapted to pivotally couple to such at least one first storage section; at least one second support arm adapted to pivotally couple to such at least one boundary rail; and at least one articulated joint adapted provide at least one degree of movement between such at least one first support arm and such at least one second support arm.

Even further, it provides such a truck tailgate extender system, wherein such at least one first connector comprises: at least one hinge adapted to assist rotational movement of such at least one extendable support about such at least one first connector; wherein such at least one hinge comprises at least two pivot points, and at least one spring adapted to urge such rotational movement.

Additionally, it provides such a truck tailgate extender system, wherein said at least one boundary rail comprises at least one illuminator adapted to provide visually discernable illumination; and said at least one illuminator is operatively coupled to at least one electrical circuit of the at least one truck bed. Even further, it provides such a truck tailgate extender system, wherein said at least one electrical circuit comprises at least one taillight wiring circuit installed by at least one manufacturer of the at least one truck bed. Additionally, it provides such a truck tailgate extender system, wherein said at least one boundary rail comprises at least one clearance indentation adapted to clearance at least one element originally installed by at least one manufacturer of the at least one tailgate. In addition, it provides each and every novel feature, element, combination, step and/or method disclosed or suggested by this provisional patent application.

BRIEF DESCRIPTION OF THE DRAWINGS

FIG. 20 shows a top view of the tailgate extender, according to the preferred embodiment of FIG. 18.

FIG. 21 shows the sectional view 21—21 of FIG. 20 illustrating the tailgate extender in a partially extended (deployed) position.

FIG. 22 shows the sectional view 22—22 of FIG. 20 illustrating the tailgate extender in a stowed position.

FIG. 29 shows an enlarged sectional view of the sectional view 27—27 of FIG. 20 illustrating the tailgate extender in a stowed position.

FIG. 30 shows the sectional view 30—30 of FIG. 20 illustrating the tailgate extender in a stowed position.

FIG. 31A shows a front view of an accessory cross bar, according to the preferred embodiment of FIG. 19.

FIG. 31B shows the sectional view 31B—31B of FIG. 31A.

FIG. 35 shows the sectional view 35—35 of FIG. 34 illustrating the tailgate extender in a raised (deployed) position.

FIG. 36 shows the sectional view 35—35 of FIG. 34 illustrating the tailgate extender in a lowered (stowed) position.

DETAILED DESCRIPTION OF THE BEST MODES AND PREFERRED EMBODIMENTS OF THE INVENTION

Figure 1A:
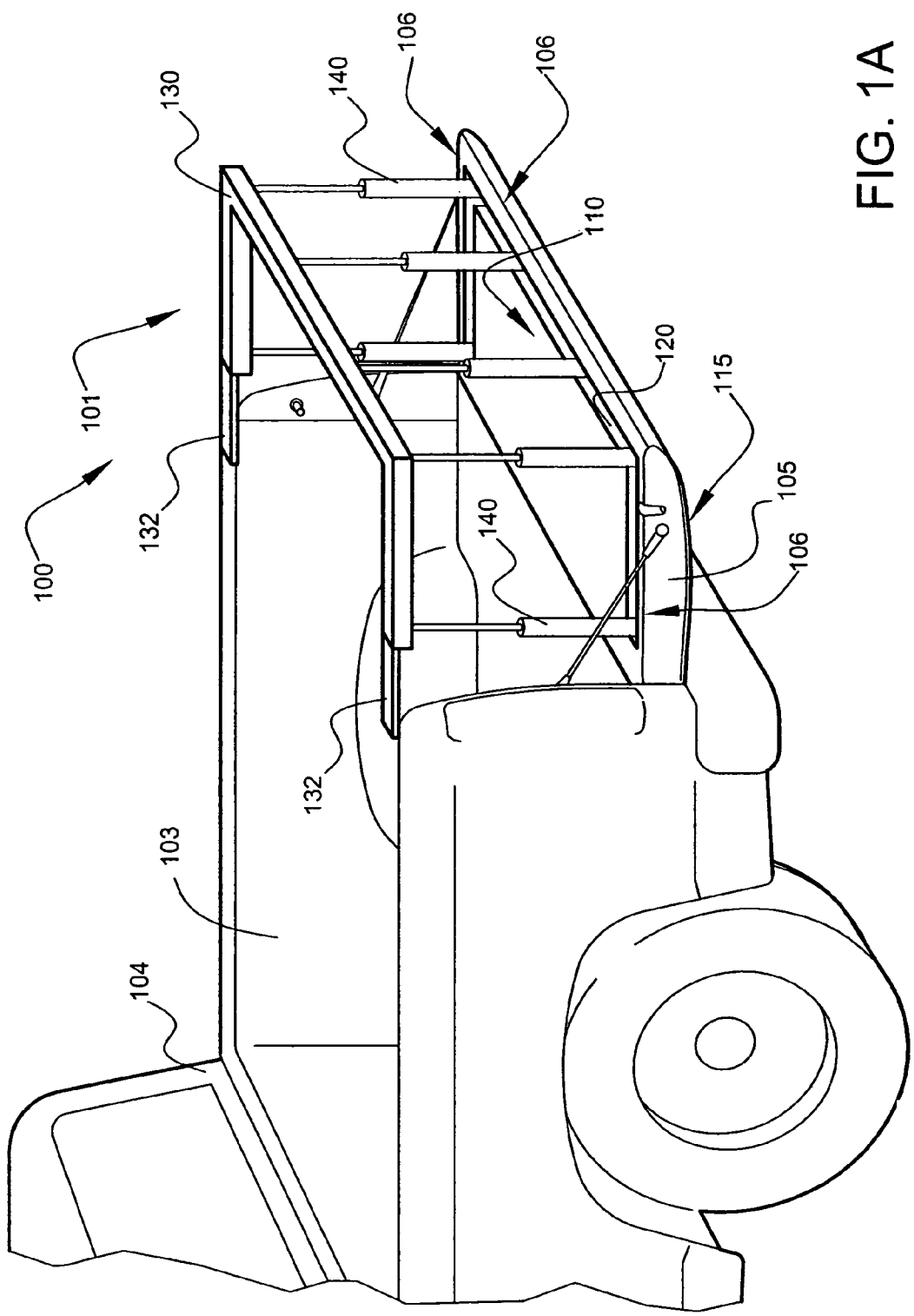
FIG. 1A shows a perspective view illustrating a tailgate extender system according to a preferred embodiment of the present invention.
Figure 1B:
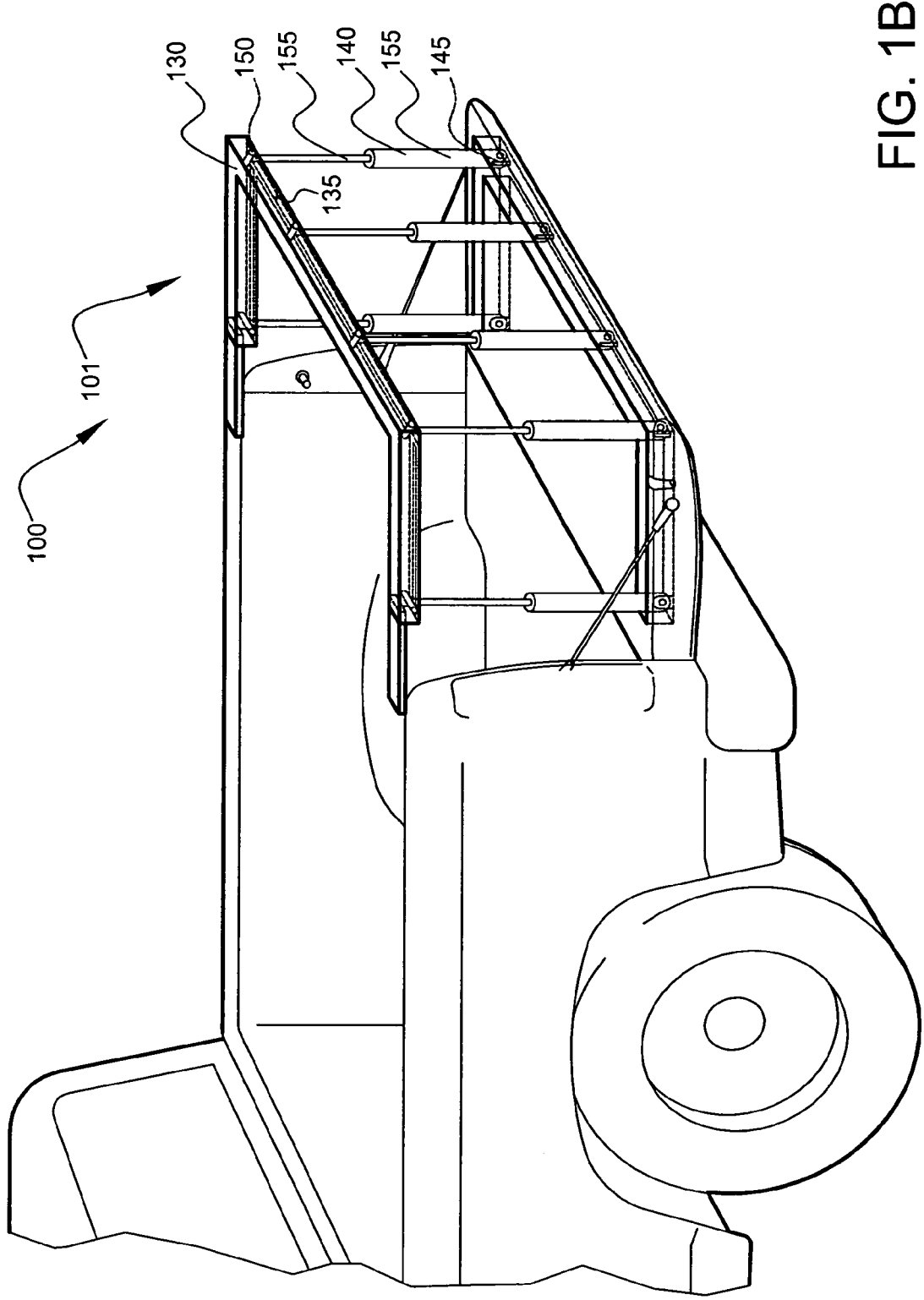
FIG. 1B shows a perspective view illustrating a tailgate extender system, according to the preferred embodiment of FIG. 1A, with hidden areas illustrated.

FIG. 1A shows a perspective view illustrating a tailgate extender system 100 according to a preferred embodiment of the present invention. FIG. 1B shows a perspective view illustrating a tailgate extender system, according to the preferred embodiment of FIG. 1A, with hidden areas illustrated.

Preferably, tailgate extender system 100 comprises tailgate extender 101, as shown. Preferably, tailgate extender system 100 comprises tailgate 105, as shown, which is preferably hingedly installed on a truck 104, as shown. Preferably, tailgate extender 101 is adapted to be retractably stored within tailgate 105, as shown. Preferably, tailgate extender system 100 is provided to consumers either as a feature originally installed on a truck 104 by the truck manufacturer, or as an aftermarket replacement tailgate 105 with tailgate extender 101. Upon reading the teachings of this specification, those with ordinary skill in the art will now understand that, under appropriate circumstances, considering such issues as advances in technology, user preference, etc., other arrangements, such as providing a tailgate extender kit for installation in an existing tailgate, providing tailgate extender systems for other types of vehicles, etc., may suffice.

Preferably, tailgate 105 comprises internal surface 110, external surface 115, and storage compartment 120, as shown. Preferably, internal surface 115 is the surface of tailgate 105 that faces the interior of the truck 104 bed when tailgate 105 is closed, and which faces upwards then tailgate 105 is open, as shown. Preferably, external surface 115 is the surface of tailgate 105 that faces the exterior of the truck 104 when tailgate 105 is closed, and which faces downwards then tailgate 105 is open, as shown. Preferably, storage compartment 120 is situated between internal surface 110 and external surface 115, as shown. Preferably, storage compartment 120 is open to and accessible through only internal surface 110, as shown.

Preferably, tailgate extender 101 comprises rail 130 and supports 140, as shown. Preferably, rail 130 is a strong, preferably continuous, rail adapted to restrain cargo. Preferably, supports 140 are strong, collapsible supports adapted to raise and lower rail 130 from within storage compartment 120, as shown. Preferably, supports 140 are also adapted to restrain cargo. Preferably, tailgate extender 101 collapses to store entirely within storage compartment 120, as shown, and raises up to at least one settable height, preferably approximately the height of the sidewalls of truck 104, as shown, when in use. Preferably, tailgate extender 101 is adjacent at least a portion of the rear perimeter 106 of tailgate 105, as shown. Upon reading the teachings of this specification, those with ordinary skill in the art will now understand that, under appropriate circumstances, considering such issues as advances in technology, user preference, etc., other arrangements, such as multi-part rails, the tailgate extender extending above the tailgate internal surface in storage, other heights, multiple adjustable heights, etc., may suffice.

Preferably, tailgate extender 101 is constructed of strong, durable material, preferably metal, most preferably steel. Upon reading the teachings of this specification, those with ordinary skill in the art will now understand that, under appropriate circumstances, considering such issues as advances in technology, user preference, etc., other materials, such as plastic, composite materials, wood, ceramics, combinations of materials, etc., may suffice.

Preferably, rail 130 comprises gap rails 132, as shown. Preferably, gap rails 132 slidingly extend from within rail 130 to bridge the gaps between rail 130 and the sidewalls of truck 104, as shown. Upon reading the teachings of this specification, those with ordinary skill in the art will now understand that, under appropriate circumstances, considering such issues as advances in technology, user preference, etc., other arrangements, such as gap rails that unfold from the rail, gap rails that attach to the truck, gap chains, etc., may suffice.

Figure 2:
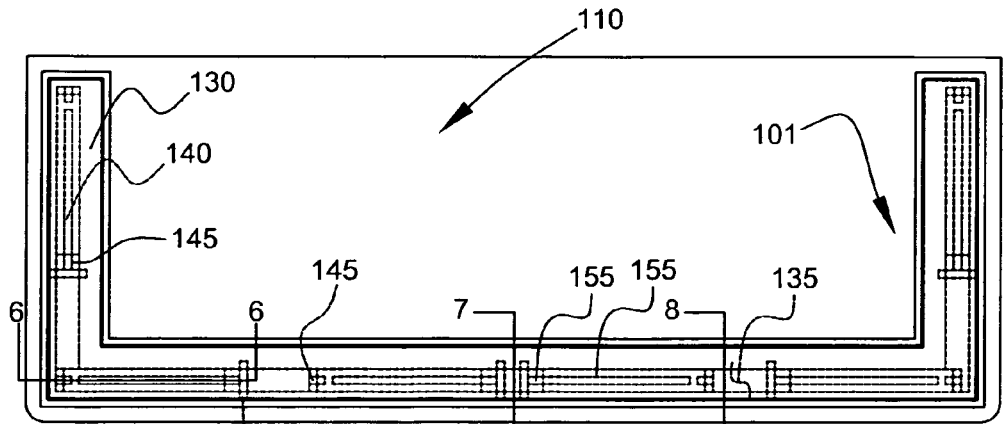
FIG. 2 shows a top view of the tailgate extender, according to the preferred embodiment of FIG. 1A, in a stowed position.

FIG. 2 shows a top view of tailgate extender 101, according to the preferred embodiment of FIG. 1A, in a stowed position. Preferably, supports 140 comprise hinge 145, slider 150, and at least two telescoping sections 155, as shown. Preferably, rail 130 comprises at least one channel 135, as shown, along which slider 150 slides when tailgate extender 101 is being raised or lowered. Preferably, slider 150 is wider than telescoping sections 155, and is substantially the same width as channel 135, as shown, so that slider 150 may slide along the length of channel 135 without becoming disengaged from channel 135. Upon reading the teachings of this specification, those with ordinary skill in the art will now understand that, under appropriate circumstances, considering such issues as advances in technology, user preference, etc., other arrangements, such as bearings, other sliding arrangements, spring-loading the channel to provide lift assistance, motorized supports, actuated supports, hydraulic supports, scissors-type collapsible supports, accordion-type collapsible supports, etc., may suffice.

Figure 3:
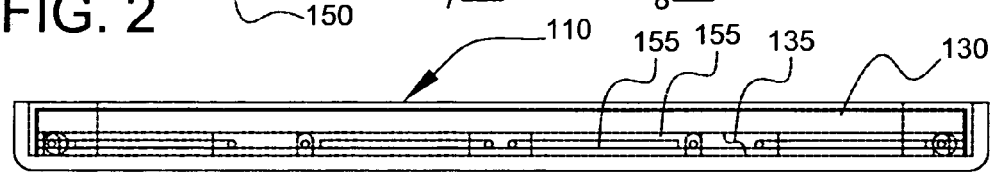
FIG. 3 shows a front view of the tailgate extender, according to the preferred embodiment of FIG. 1A, in a stowed position.

FIG. 3 shows a front view of tailgate extender 101, according to the preferred embodiment of FIG. 1A, in a stowed position. Preferably, telescoping sections 155 collapse, lay over parallel to internal surface 110, and are recessed into rail 130 and channel 135 during storage, as shown. Upon reading the teachings of this specification, those with ordinary skill in the art will now understand that, under appropriate circumstances, considering such issues as advances in technology, user preference, etc., other arrangements, such as the slider being longer and angled so that the telescoping supports do not recess into the channel and/or the rail, etc., may suffice.

Figure 4:
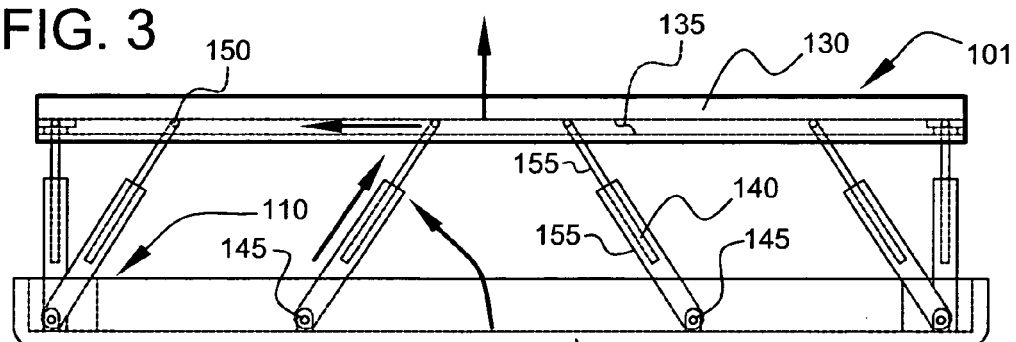
FIG. 4 shows a front view of the tailgate extender, according to the preferred embodiment of FIG. 1A, in a partially extended position.

FIG. 4 shows a front view of tailgate extender 101, according to the preferred embodiment of FIG. 1A, in a partially extended position. Preferably, to use tailgate extender 101, tailgate 105 is lowered (at least embodying herein the step of lowering such at least one tailgate), and then rail 130 is pulled up in translational motion perpendicular to internal surface 110 (at least embodying herein the step of extending at least one barrier from substantially within such at least one tailgate, through such at least one inner surface, and substantially perpendicular to such at least one inner surface), which causes telescoping sections 155 to extend and rotate angularly toward vertical as sliders 150 slide along channel 135, as shown. The directions of motion to raise tailgate extender 101 for use are shown with arrows. Preferably, to return tailgate extender 101 to storage, supports 140 are unlocked, and then rail 130 is lowered in translational motion perpendicular to internal surface 110. The directions of motion to lower tailgate extender 101 for storage are the opposite of the shown arrows (at least embodying herein the step of lowering such at least one barrier substantially perpendicular to such at least one inner surface, through such at least one inner surface, and substantially into such at least one tailgate). Upon reading the teachings of this specification, those with ordinary skill in the art will now understand that, under appropriate circumstances, considering such issues as advances in technology, user preference, etc., other component arrangements, such as multiple channels guiding multiple layers of supports, etc., may suffice.

Figure 5:
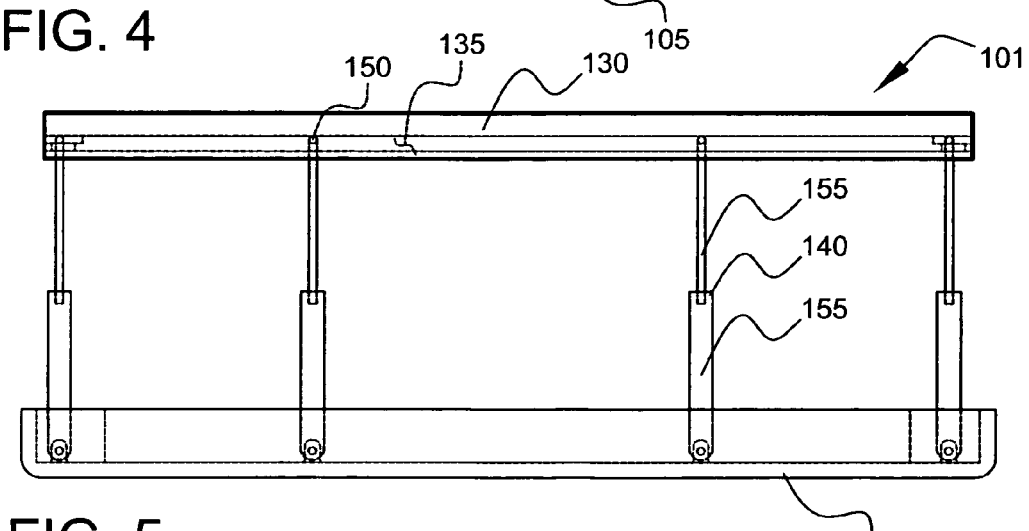
FIG. 5 shows a front view of the tailgate extender, according to the preferred embodiment of FIG. 1A, in a fully extended position.

FIG. 5 shows a front view of tailgate extender 101, according to the preferred embodiment of FIG. 1A, in a fully extended position. Preferably, when telescoping sections 155 are extended to their maximum height, telescoping sections 155 lock into position and remain extended, as shown (at least embodying herein the step of releasably locking such at least one barrier in at least one extended position). Preferably, supports 140 are substantially vertical, relative to open tailgate 105, when fully extended and ready for use, as shown. Upon reading the teachings of this specification, those with ordinary skill in the art will now understand that, under appropriate circumstances, considering such issues as advances in technology, user preference, etc., other arrangements, such as locking portions in the channel which releasably capture the sliders when the supports are fully vertical, multiple locking heights, continuously variable locking heights, the supports being independently lockable such that the rail may be held tilted at an angle, the supports locking at an angle during use, powered supports being held at an angle during use, etc., may suffice.

Figure 6:
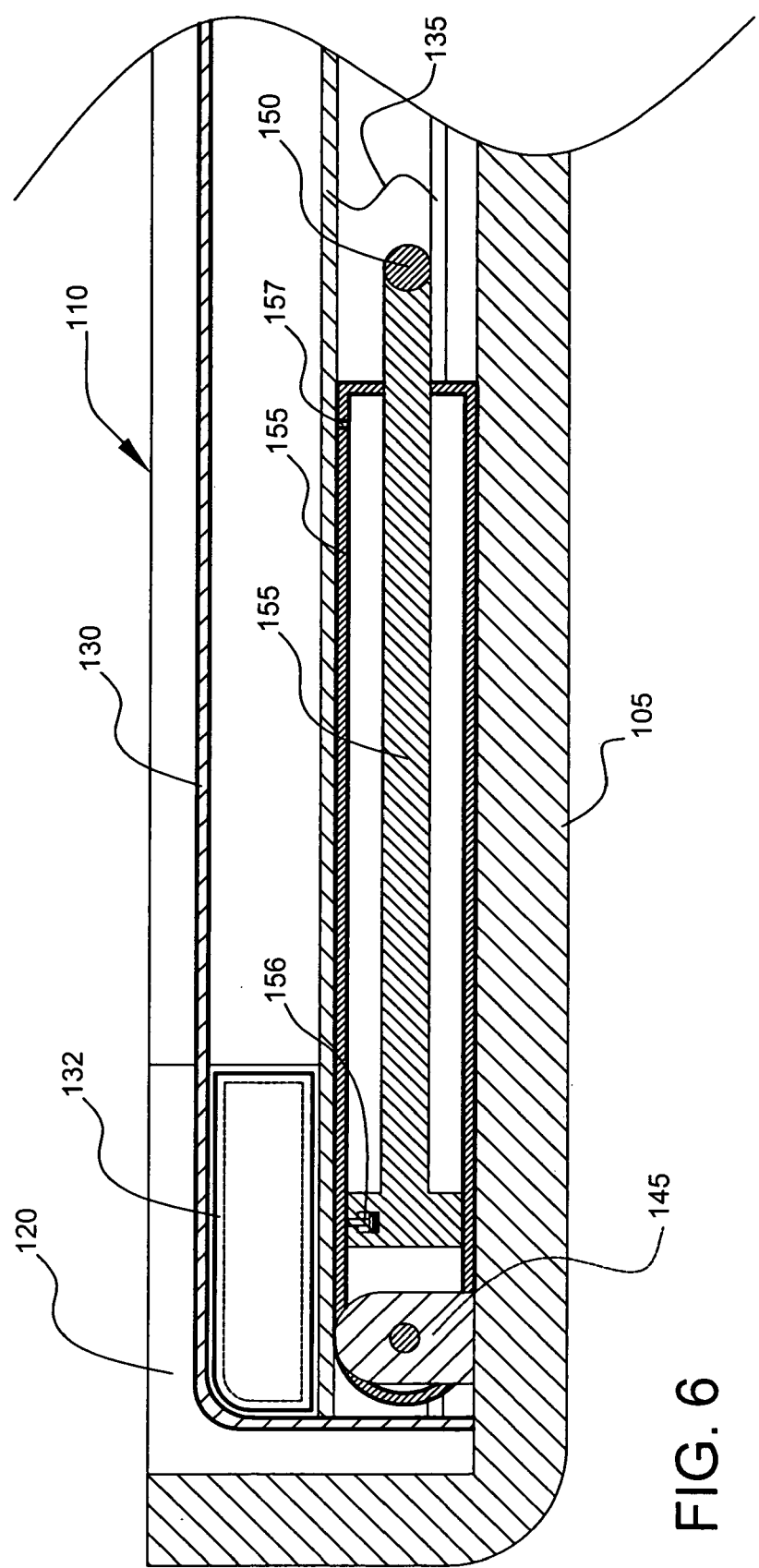
FIG. 6 shows the sectional view 6—6 of FIG. 2.

FIG. 6 shows the sectional view 6-6 of FIG. 2 according to the preferred embodiment of FIG. 1A. Preferably, telescoping sections 155 lock with button lock 156, as shown.

Preferably, button lock 156 engages hole 157 when telescoping sections 155 are fully extended. Upon reading the teachings of this specification, those with ordinary skill in the art will now understand that, under appropriate circumstances, considering such issues as advances in technology, user preference, etc., other locking mechanisms, such as twist-locks, ratchets, clamps, multiple holes permitting multiple heights, etc., may suffice.

Figure 7:
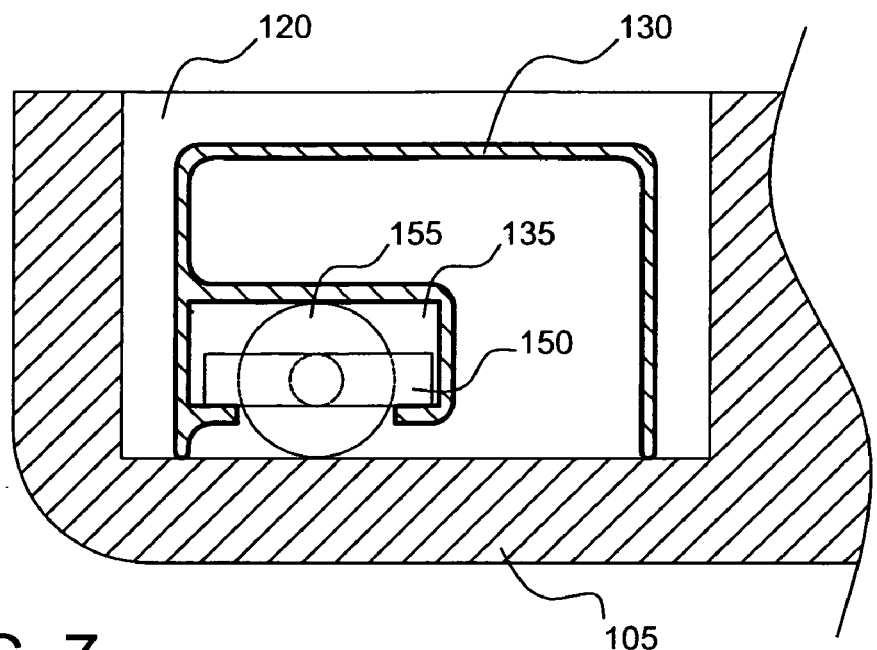
FIG. 7 shows the sectional view 7—7 of FIG. 2.

FIG. 7 shows the sectional view 7—7 of FIG. 2 according to the preferred embodiment of FIG. 1A. Preferably, slider 150 is sized and shaped to be locked within channel 135, as shown. Preferably, the opening into channel 135 is wide enough, and the height of channel 135 is high enough, to permit telescoping sections 155 to nest within channel 135 during storage, as shown.

Figure 8:
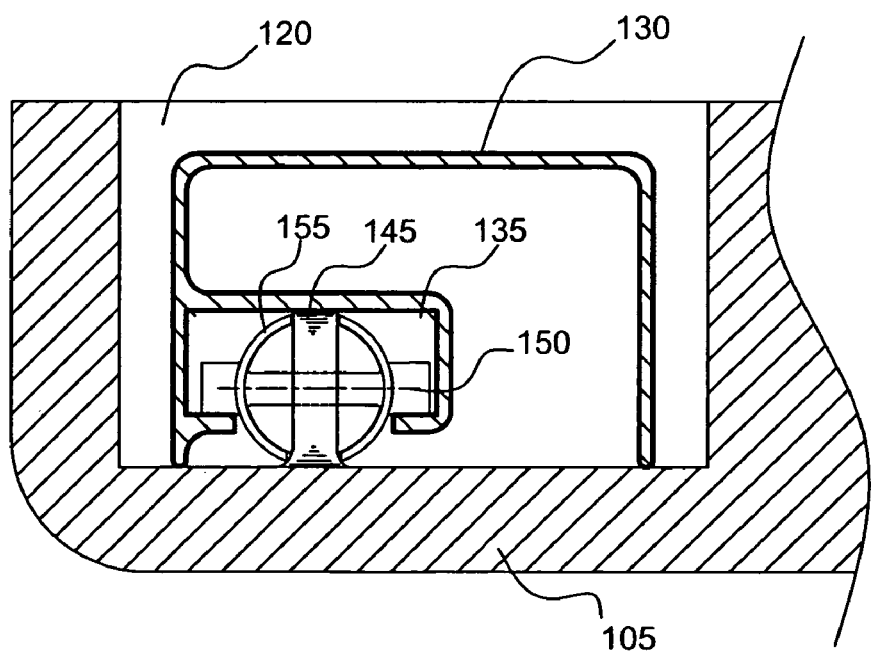
FIG. 8 shows the sectional view 8—8 of FIG. 2.

FIG. 8 shows the sectional view 8—8 of FIG. 2 according to the preferred embodiment of FIG. 1A. Preferably, hinge 145 is adapted to permit telescoping sections 155 to pivot only substantially parallel to adjacent channel 135, as shown.

Preferably, rail 130 is of sufficient size and strength to withstand impact from cargo shifting in the cargo bed of truck 104. Preferably, rail 130 has a cross section of sufficient size to contain channel 135, as shown. More preferably, rail 130 has a cross section of sufficient size to contain channel 135, retractor 205 (shown in FIGS. 9–12), and/or gap rails 132, as shown. Upon reading the teachings of this specification, those with ordinary skill in the art will now understand that, under appropriate circumstances, considering such issues as advances in technology, user preference, etc., other cross-sectional shapes, such as novelty shaped, shaped to match the theme of the truck, thin and flexible cable with no channel (instead threaded through the ends of the supports), etc., may suffice.

Figure 9:
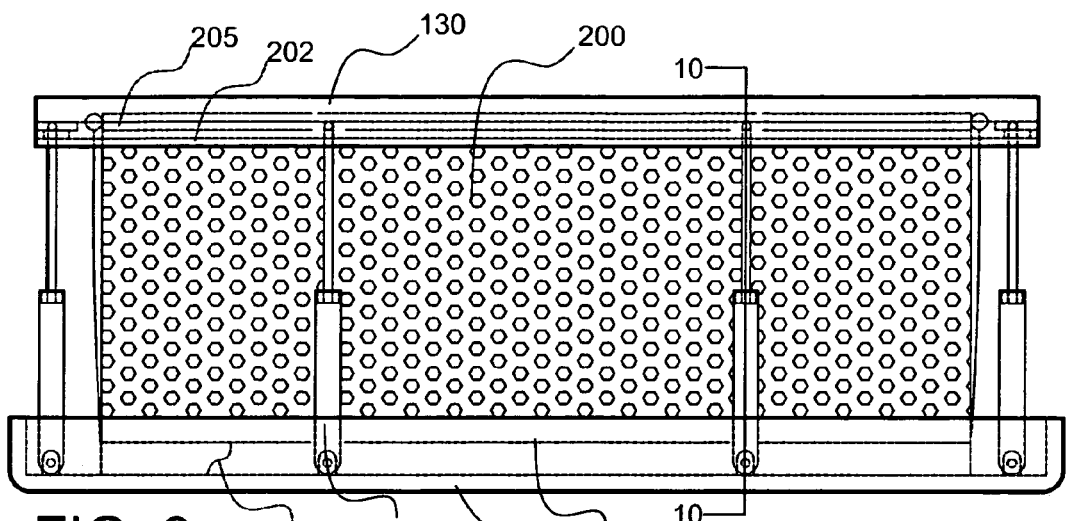
FIG. 9 shows a front view of the tailgate extender, according to the preferred embodiment of FIG. 1A, in a fully extended position, with cargo netting.

FIG. 9 shows a front view of tailgate extender 101, according to the preferred embodiment of FIG. 1A, in a fully extended position, with cargo netting 200. Preferably, cargo netting 200 is used to prevent cargo from moving through the gaps between supports 140. Preferably, cargo netting 200 is attached to rail 130 at the top edge 202 of cargo netting 200 and to tailgate 105 at the bottom edge 204 of cargo netting 200, as shown. Preferably, cargo netting 200 is attached to retractor 205, which is preferably installed within rail 130, as shown. Preferably, retractor 205 is a strong spring-loaded roller of the sort known in the art of retractable cargo-covers. Preferably, the bottom edge 204 of cargo netting 200 is attached to tailgate 105 inside storage compartment 120 (at least embodying herein the step of extending at least one flexible barrier from substantially within such at least one extended barrier to such at least one inner surface of such at least one tailgate). Preferably, cargo netting 200 comprises strong plastic or fabric cargo netting of the sort known in the art. Upon reading the teachings of this specification, those with ordinary skill in the art will now understand that, under appropriate circumstances, considering such issues as advances in technology, user preference, etc., other arrangements, such as the retractor being installed on the exterior of the rail, a single cargo net covering an entire facet of the perimeter of the tailgate, cargo net retractors in the gap rails, other types of retractors, powered retractors, other cargo netting materials, such as metal, etc., may suffice.

Figure 10:
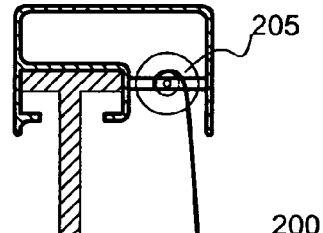
FIG. 10 shows the sectional view 10—10 of FIG. 9.

FIG. 10 shows the sectional view 10—10 of FIG. 9. Preferably, cargo netting 200 is attached to tailgate 105 inside storage compartment 120 with attachers 220, such as, for example, hook and loop fasteners, as shown. Upon reading the teachings of this specification, those with ordinary skill in the art will now understand that, under appropriate circumstances, considering such issues as advances in technology, user preference, etc., other attachers, such as hooks and grommets, snaps, magnets, clips, clamps, permanent attachment, etc., may suffice.

Figure 11:
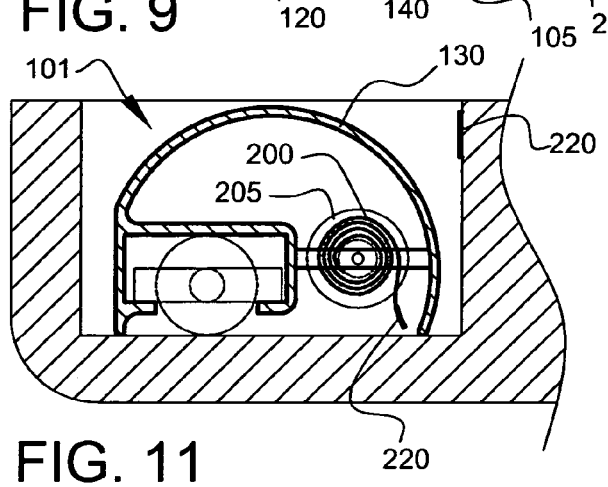
FIG. 11 shows a cross-sectional view of a stored tailgate extender, with a cargo net retractor in the top rail, according to a preferred embodiment of the present invention.

FIG. 11 shows a cross-sectional view of a stored tailgate extender 101, with cargo net retractor 205 in rail 130. Preferably, tailgate extender 101 is stored by first releasing cargo netting 200 from attachers 220, then retracting cargo netting 200 onto retractor 205, and then lowering tailgate extender 101. Upon reading the teachings of this specification, those with ordinary skill in the art will now understand that, under appropriate circumstances, considering such issues as advances in technology, user preference, etc., other arrangements, such as the cargo netting being automatically retracted as the tailgate extender is lowered, etc., may suffice.

Figure 12:
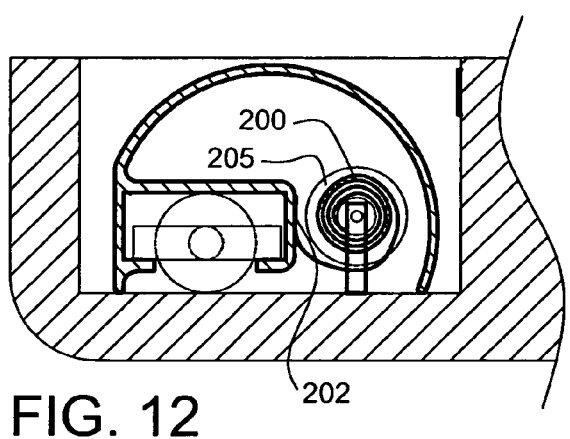
FIG. 12 shows a cross-sectional view of a stored tailgate extender, with a cargo net retractor in the storage compartment, according to a preferred embodiment of the present invention.

FIG. 12 shows a cross-sectional view of a stored tailgate extender 101, with cargo net retractor 205 in storage compartment 120. Preferably, retractor 205 is attached to storage compartment 120, and the top edge 202 of cargo netting 120 is attached to rail 130, as shown. Preferably, when tailgate extender 101 is raised and lowered, cargo netting 200 is automatically raised and lowered also. Upon reading the teachings of this specification, those with ordinary skill in the art will now understand that, under appropriate circumstances, considering such issues as advances in technology, user preference, etc., other arrangements, such as cargo netting adapted to fold accordion-style instead of rolling up, etc., may suffice.

Figure 13:
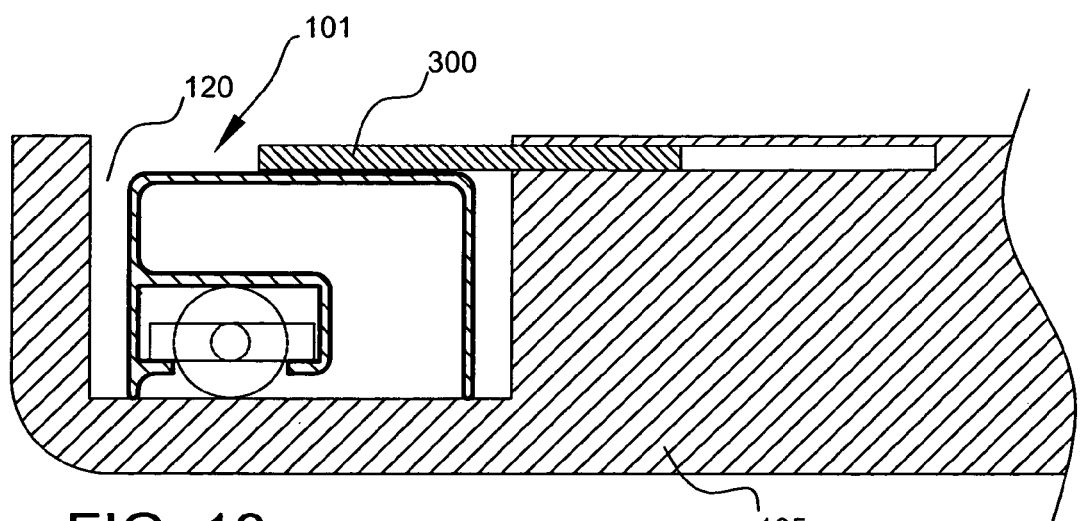
FIG. 13 shows a cross-sectional view of a stored tailgate extender, similar to FIG. 7, with a retractable storage compartment cover, according to a preferred embodiment of the present invention.

FIG. 13 shows a cross-sectional view of a stored tailgate extender 101, similar to FIG. 7, with a retractable storage compartment cover 300. Preferably, retractable storage compartment cover 300 extends from inside tailgate 105, as shown, and covers storage compartment 120 when tailgate extender 101 is collapsed into storage compartment 120. Preferably, retractable storage compartment cover 300 creates a waterproof seal over storage compartment 120 that protects tailgate extender 101 from dirt and weather.

Figure 14:
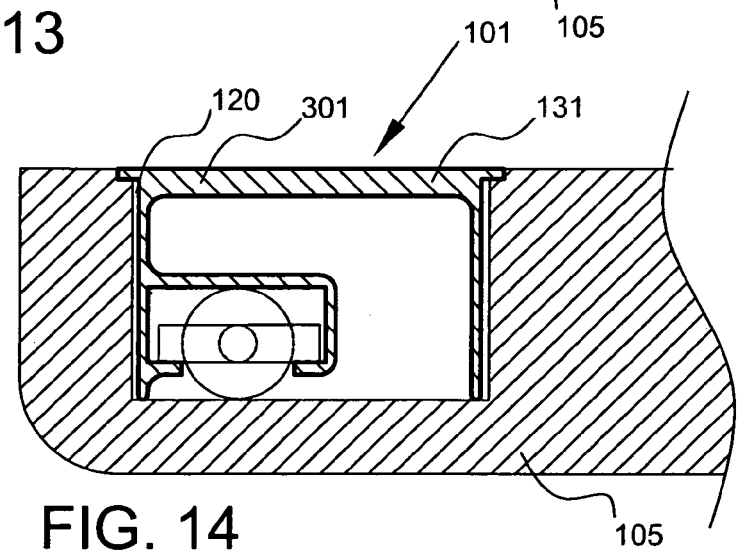
FIG. 14 shows a cross-sectional view of a stored tailgate extender with an integral storage compartment cover, according to a preferred embodiment of the present invention.

FIG. 14 shows a cross-sectional view of a stored tailgate extender 101 with an integral storage compartment cover 301. Preferably, rail 130 comprises rail 131, as shown. Preferably, rail 131 seals against the edges of storage compartment 120 to form an integral storage compartment cover 301, as shown.

Figure 15:
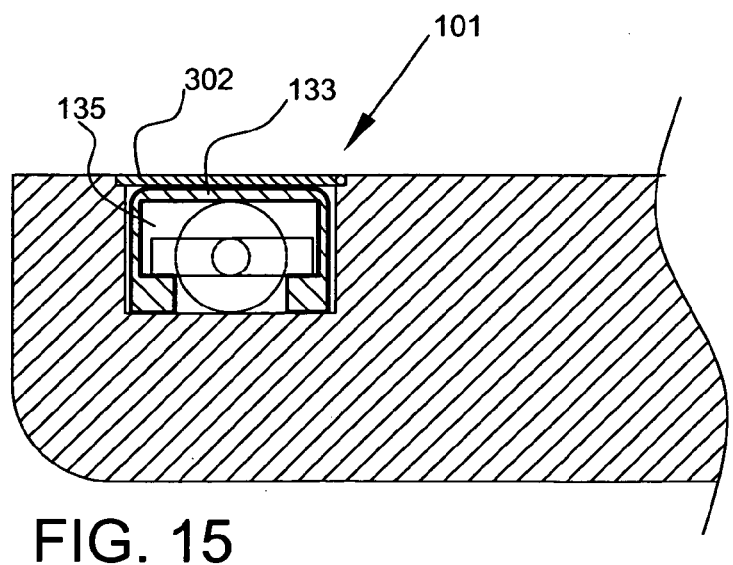
FIG. 15 shows a cross-sectional view of a stored tailgate extender, with a small rail, with a hinged storage compartment cover, according to a preferred embodiment of the present invention.

FIG. 15 shows a cross-sectional view of a stored tailgate extender 101, with a small rail 133, with a hinged storage compartment cover 302. Preferably, hinged storage compartment cover 302 creates a waterproof seal over storage compartment 120 that protects tailgate extender 101 from dirt and weather. Preferably, rail 130 comprises rail 133, as shown. Preferably, rail 133 substantially comprises only channel 135, as shown, providing a very compact design especially suitable for thin tailgates 105. Upon reading the teachings of this specification, those with ordinary skill in the art will now understand that, under appropriate circumstances, considering such issues as advances in technology, user preference, etc., other storage compartment covers, such as separate covers, other types of retractable covers, etc., may suffice.

Figure 16:
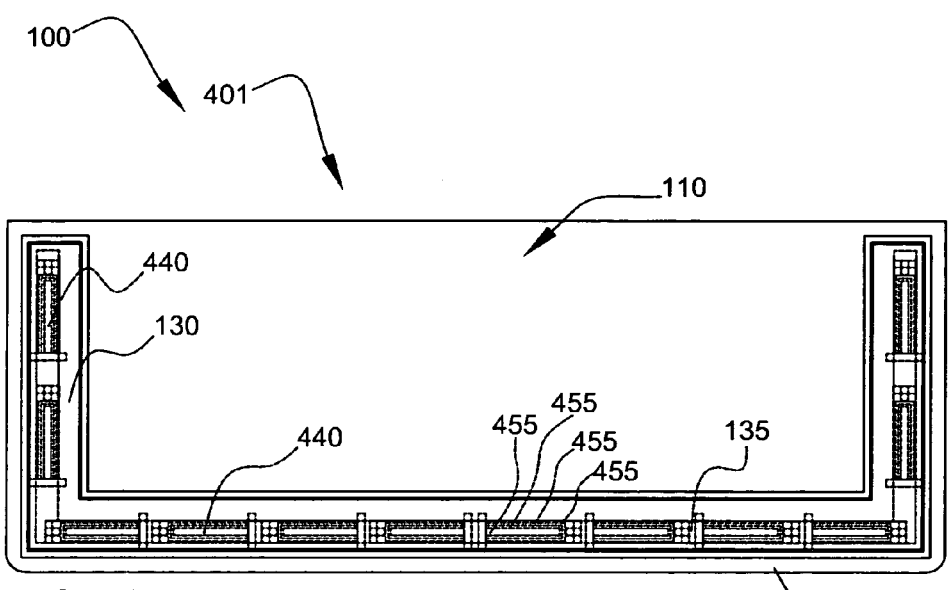
FIG. 16 shows a top view of a tailgate extender, according to a preferred embodiment of the present invention, in a stowed position.

FIG. 16 shows a top view of a tailgate extender 401, according to a preferred embodiment of the present invention, in a stowed position. Preferably, tailgate extender system 100 comprises tailgate extender 401, as shown. Preferably, the number of supports 140 supporting tailgate extender 401 may be increased by using supports 440 with increased numbers of telescoping sections 455, such as, for example, four telescoping sections 455, as shown. This permits tailgate extender 401 to be stronger, with narrower gaps between supports 440. Upon reading the teachings of this specification, those with ordinary skill in the art will now understand that, under appropriate circumstances, considering such issues as advances in technology, user preference, intended use, etc., other numbers of supports, such as ten, twelve, seven, etc., may suffice. Upon reading the teachings of this specification, those with ordinary skill in the art will now understand that, under appropriate circumstances, considering such issues as advances in technology, user preference, intended use, etc., other numbers of telescoping sections, such as three, five, six, seven, ten, etc., may suffice.

Figure 17:
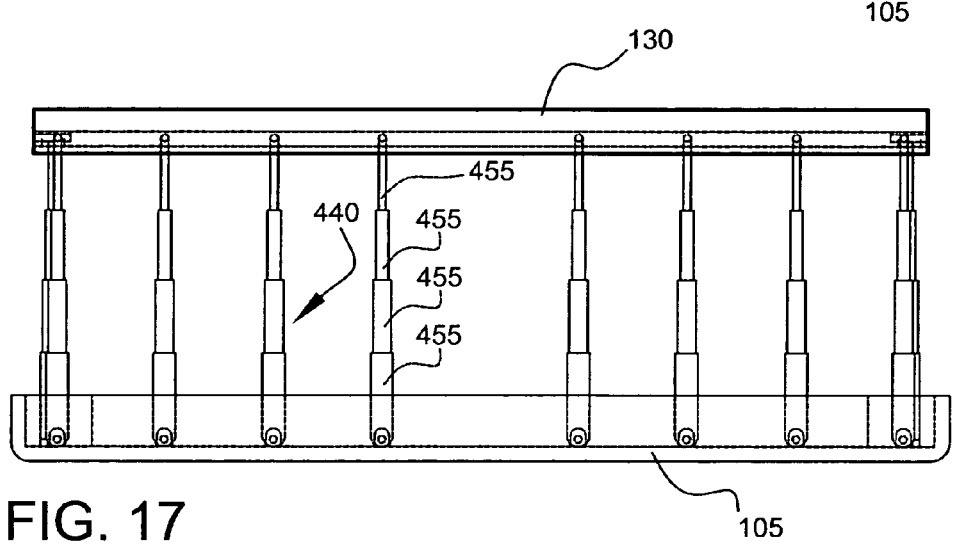
FIG. 17 shows a front view of the tailgate extender, according to the preferred embodiment of FIG. 16, in a fully extended position.

FIG. 17 shows a front view of tailgate extender 401, according to the preferred embodiment of FIG. 16, in a fully extended position. Preferably, tailgate extender 401 stores, extends, and functions in the same way as tailgate extender 101.

Figure 18:
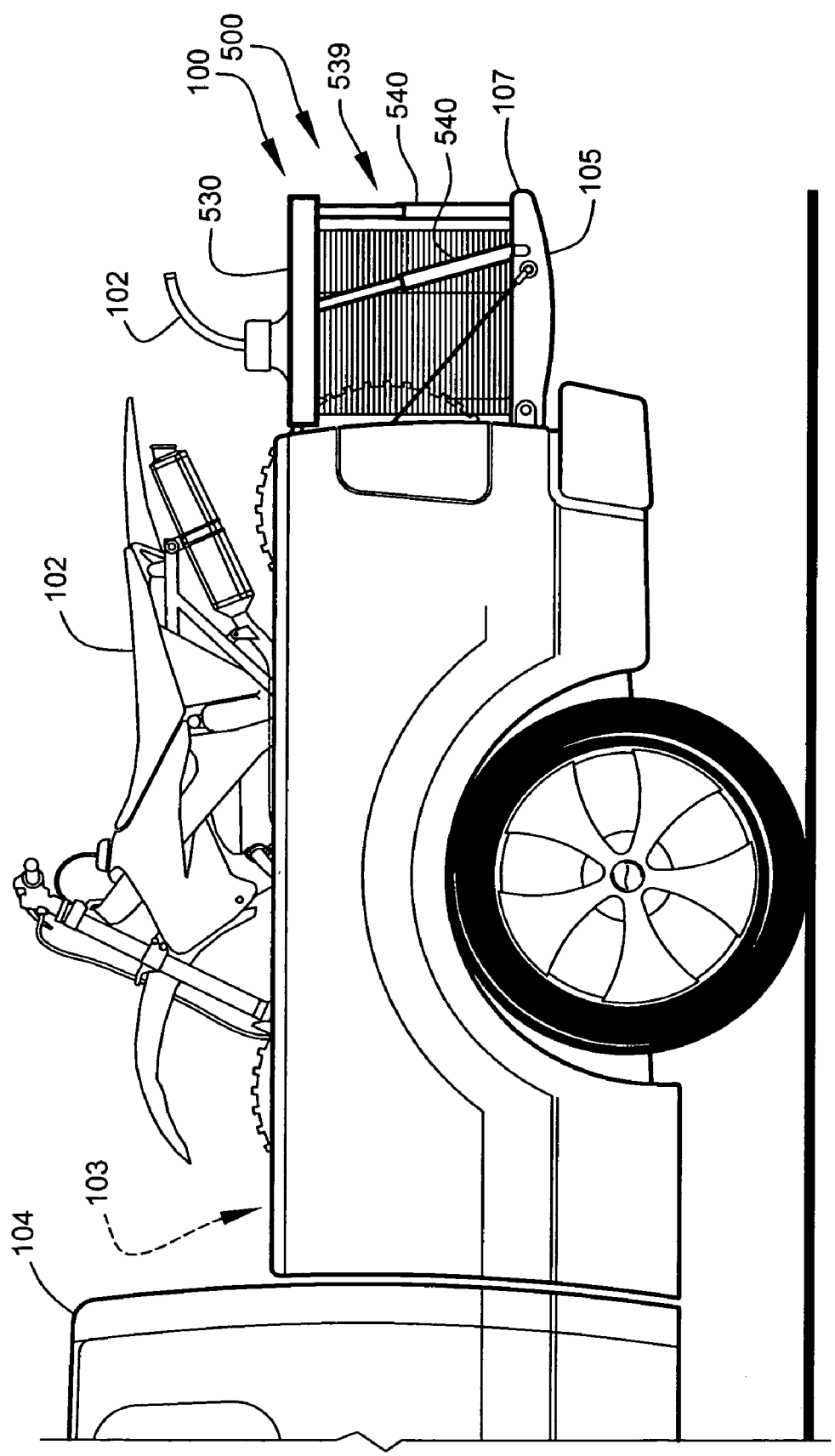
FIG. 18 shows a side view illustrating a tailgate extender of the tailgate extender system according to another preferred embodiment of the present invention.
Figure 19:
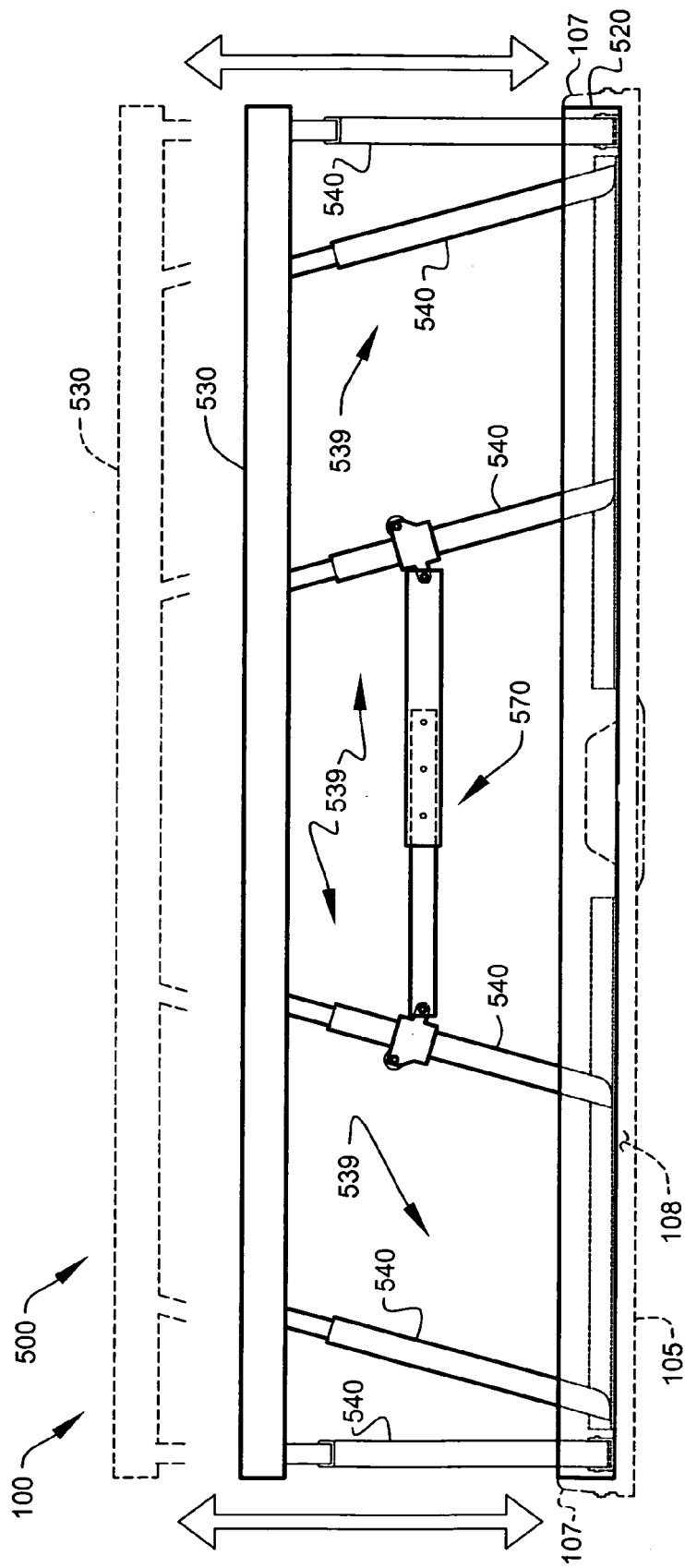
FIG. 19 shows a front view of the tailgate extender, according to the preferred embodiment of FIG. 18, in a partially extended position.

FIG. 18 shows a side view illustrating tailgate extender 500 of tailgate extender system 100 according to another preferred embodiment of the present invention. FIG. 19 shows a front view of tailgate extender 500, according to the preferred embodiment of FIG. 18. FIG. 19 illustrates tailgate extender 500 in a partially extended position.

As previously depicted, tailgate 105 is pivotally mounted on truck 104, as shown. Preferably, tailgate extender 500 is adapted to be retractably stored within first storage compartment 520, as shown. Preferably, first storage compartment 520 is mounted substantially within interior cavity 108 of tailgate 105 (see also FIG. 22).

Preferably, tailgate extender 500 comprises boundary rail 530 movably supported by arrangement of telescoping support bars identified herein as extendable support assembly 539, as shown. Preferably, boundary rail 530 comprises a substantially rigid, substantially continuous member, adapted to retain cargo 102 within cargo bed 103, as shown. Preferably, boundary rail 530 is of sufficient size and strength to withstand impact from cargo shifting in the cargo bed of truck 104.

Preferably, extendable support assembly 539 comprises a set of extendable supports 540, as shown. Preferably, extendable supports 540 comprise a set of length adjustable bars, adapted to raise and lower boundary rail 530 along a substantially vertical path. In addition, extendable supports 540 preferably function to assist in retaining cargo 102 within cargo bed 103, as shown.

Preferably, tailgate extender 500 is adapted to deploy to at least one user-settable height, as shown. Upon reading the teachings of this specification, those with ordinary skill in the art will now understand that, under appropriate circumstances, considering such issues as advances in technology, user preference, etc., other arrangements, such as multi-part rails, the tailgate extender extending above the tailgate internal surface in storage, other heights, multiple adjustable heights, etc., may suffice.

Preferably, boundary rail 530, extendable supports 540, and first storage compartment 520 are constructed of at least one, preferably a combination of materials having an application-appropriate level of durability and weather resistance. Preferably, tailgate extender 500 substantially comprises metal, most preferably steel and/or aluminum. Upon reading the teachings of this specification, those with ordinary skill in the art will now understand that, under appropriate circumstances, considering such issues as advances in technology, user preference, etc., other materials, such as plastic, composite materials, wood, ceramics, combinations of materials, etc., may suffice. For the example vehicle illustrated in FIG. 18, tailgate extender 500 comprises a stowed size of about 60 inches length, about 20 inches width, and about 3-½ inches depth.

FIG. 20 shows a top view of the tailgate extender, according to the preferred embodiment of FIG. 18. Preferably, tailgate extender 500 is installed adjacent to, preferably within, tailgate 105 (depicted by dashed lines). Preferably, tailgate extender 500 is configured to form a fence-like boundary along at least one, more preferably, three of the perimeter edges 107 of tailgate 105, as shown. Preferably, boundary rail 530 comprises first side-rail portion 530a, second side-rail portion 530b, and rear rail portion 530c, as shown. Preferably, first side-rail portion 530a, second side-rail portion 530b, and rear rail portion 530c are rigidly joined at intersecting corners 531 forming a generally "U" shaped member, as shown. Preferably, the trough-like first storage compartment 520 is similarly adapted to form a corresponding "U" shape, as shown.

Tailgate extender 500 further comprises at least one second accessory storage area identified herein as second storage compartment 543. Preferably, second storage compartment 543 is situated adjacent first storage compartment 520 generally between first side-rail portion 530a, second side-rail portion 530b, and rear rail portion 530c, as shown. Preferably, second storage compartment 543 is adapted to hold storable articles such as tools, small cargo items, emergency equipment, etc. Upon reading the teachings of this specification, those with ordinary skill in the art will now understand that, under appropriate circumstances, considering issues such as vehicle type, user preference, etc., other storage arrangements, such as, for example, adapting a secondary storage space to the storage of automatic gate actuators, motors, drives, audio speakers, audio amplifiers, video displays, etc., may suffice. Furthermore, those with ordinary skill in the art will now understand that, under appropriate circumstances, considering issues such as vehicle type, user preference, etc., other storage arrangements, such as, for example, equipping the secondary storage with tool holders, cargo restraints, storage clips, etc., may suffice. Preferably, second storage compartment 543 comprises cover 544 (illustrated in partial cut-away), preferably a securable (lockable) cover hingedly attached to second storage compartment 543 at cover hinge 546, as shown.

FIG. 21 shows the sectional view 21—21 of FIG. 20 illustrating tailgate extender 500 in a partially extended (deployed) position. FIG. 22 shows the sectional view 22—22 of FIG. 20 illustrating tailgate extender 500 in a stowed position. Preferably, tailgate extender 500 is adapted to be stowable substantially entirely within first storage compartment 520, as shown. Preferably, extendable supports 540 are adapted to collapse and pivot to lie in a nearly horizontal position within base channel 542, as shown. Preferably, base channel 542 is firmly mounted to the floor of first storage compartment 520, as shown. Upon reading the teachings of this specification, those with ordinary skill in the art will now understand that, under appropriate circumstances, considering such issues as advances in technology, user preference, etc., other arrangements, such as the slider being longer and angled so that the telescoping supports do not recess into the channel and/or the rail, etc., may suffice.

Preferably, to use tailgate extender 500, tailgate 105 is lowered (at least embodying herein the step of lowering such at least one tailgate), and boundary rail 530 is pulled in a translational motion substantially perpendicular to the pivot axis 549 of tailgate 105, as shown. Preferably, such translational movement of boundary rail 530 results in the telescopic lengthening of extendable supports 540, as shown. Preferably, as extendable supports 540 lengthen, they rotate angularly toward positions approaching perpendicular (relative to pivot axis 549), as shown. Preferably, sliders 550, coupled to extendable supports 540, translate horizontally along the interior of internal channel 535, thus allowing the angular rotation of extendable supports 540, as shown. At a predetermined height, the movement of sliders 550 are locked, thus fixing boundary rail 530 in the deployed position. The directions of components motions in FIG. 21 are diagrammatically depicted with arrows.

Preferably, to return tailgate extender 500 to the stowed arrangement of FIG. 22, extendable supports 540 are unlocked, and boundary rail 530 is lowered in a translational motion generally perpendicular to pivot axis 549. The directions of motion to lower tailgate extender 500 for storage are opposite of the arrow depictions of FIG. 21 (at least embodying herein the step of lowering such at least one barrier).

Preferably, tailgate extender 500 comprises cargo netting 200, as shown. Preferably, cargo netting 200 is used to prevent cargo from moving through the gaps between extendable supports 540. Preferably, cargo netting 200 is attached to boundary rail 530 at the top edge 202 of cargo netting 200 and to retractor 505 at the bottom edge 204 of cargo netting 200, as shown (at least embodying herein the step of extending at least one flexible barrier from substantially within such at least one extended barrier to such at least one inner surface of such at least one tailgate). Preferably, retractor 505 is mounted within first storage compartment 520, as shown. Preferably, retractor 505 comprises a spring-loaded roller. Preferably, the bottom edge 204 of cargo netting 200 is attached to retractor 505, as shown. Preferably, cargo netting 200 comprises durable plastic or fabric cargo netting. Upon reading the teachings of this specification, those with ordinary skill in the art will now understand that, under appropriate circumstances, considering such issues as advances in technology, user preference, etc., other arrangements, such as the retractor being installed on the exterior of the storage compartment, a single cargo net covering an entire facet of the perimeter of the tailgate, cargo net retractors in the rail extenders, other types of retractors, powered retractors, other cargo netting materials, such as metallic fabric, etc., may suffice.

Preferably, boundary rail 530 is adapted to lower fully into first storage compartment 520 without interfering with the existing tailgate assemblies, such as, for example, factory gate release mechanism 117 (indicated in dashed lines). To accommodate such existing structures, boundary rail 530 is preferably modified with at least one clearance notch 551, as shown. Depending on the manufacturer, make, and model of vehicle, boundary rail 530 preferably comprises one or more clearance notches 551, as shown. In the present embodiment, clearance notch 551 is preferably used to provide boundary rail clearance at factory gate release mechanism 117, as shown. Upon reading the teachings of this specification, those of ordinary skill in the art will now understand that, under appropriate circumstances, considering such issues as user preference, intended use, etc., other clearance accommodations, such as apertures, bends, offsets, recesses, etc., may suffice.

Figure 23:
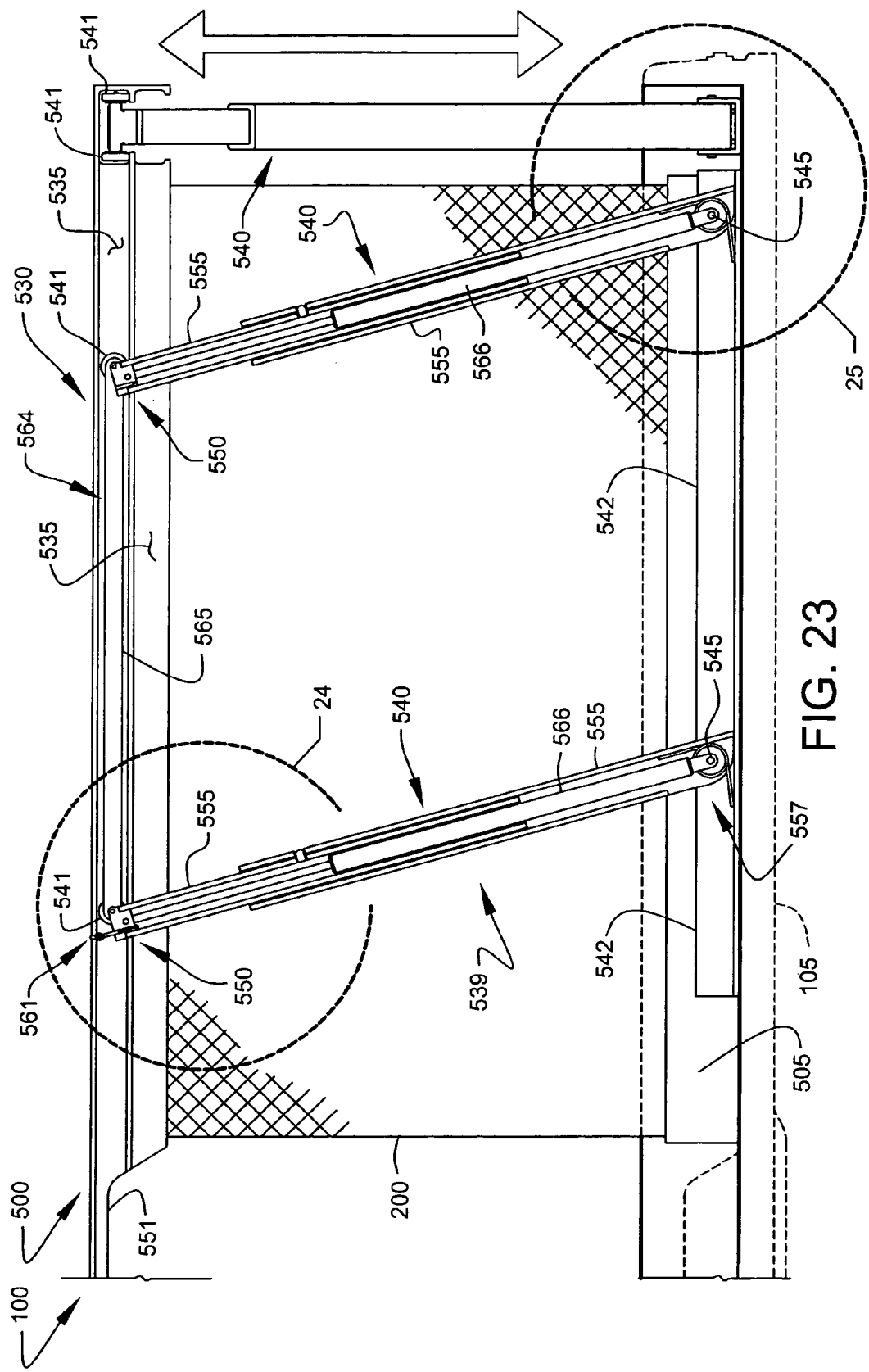
FIG. 23 shows the detailed sectional view 23 of FIG. 21.
Figure 25:
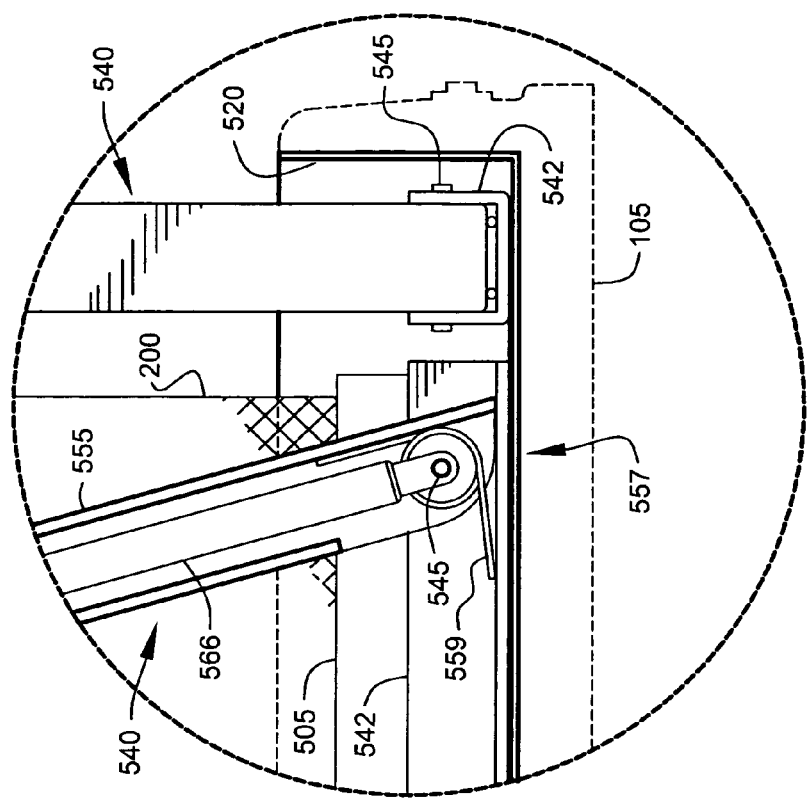
FIG. 25 shows the detailed sectional view 25 of FIG. 23.
Figure 24:
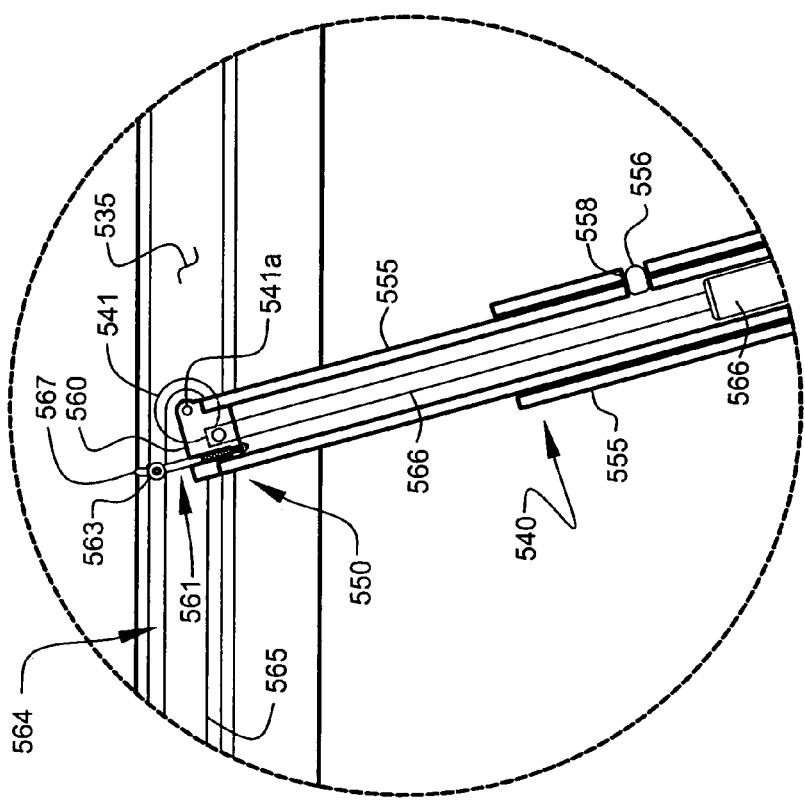
FIG. 24 shows the detailed sectional view 24 of FIG. 23.
Figure 26:
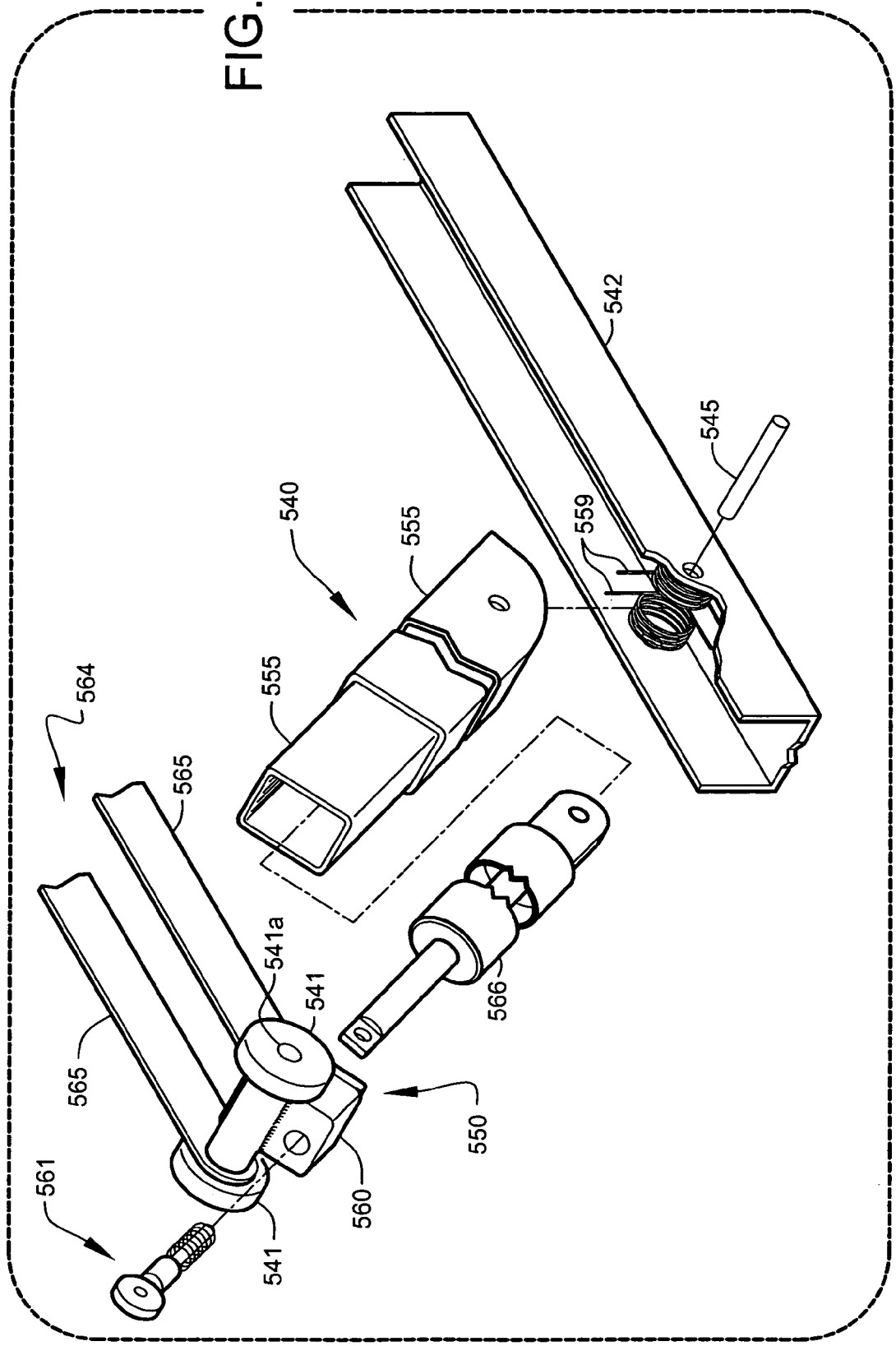
FIG. 26 shows an exploded detail of operable components of the tailgate extender.

Reference is now made to FIG. 23, FIG. 24, FIG. 25, and FIG. 26 with continued reference to FIG. 19 and FIG. 20. FIG. 23 shows the detailed sectional view 23 of FIG. 21, FIG. 24 shows the detailed sectional view 24 of FIG. 23, FIG. 25 shows the detailed sectional view 25 of FIG. 23, and FIG. 26 shows an exploded detail of operable components of the tailgate extender.

Preferably, each extendable support 540 is constructed using a pair of telescoping sections 555, preferably comprising interfitting tubes, preferably square tube members, which permit the length of extendable support 540 to be slidably adjusted for length, as shown. Preferably, extendable supports 540 are adjustable to at least one pre-selected length (preferably corresponding to the height of the vehicle bed), as shown. Preferably, when extendable supports 540 are extended to the preset length, telescoping sections 555 releasably interlock into a fixed position and remain extended, as shown (at least embodying herein the step of releasably locking such at least one barrier in at least one extended position). During deployment, extendable supports 540 preferably swings through a near 90-degree arc, as shown. Preferably, in the locked position, extendable supports 540 are oriented near vertical, relative to open tailgate 105, when fully extended and ready for use, as shown. Preferably, the angular rotation of extendable supports 540 is limited to less than 90-degrees relative to pivot axis 549, as shown. This preferred limit of rotation arranges extendable supports 540 to allow a smooth downward angular rotation of extendable supports 540 during the lowering and stowing of tailgate extender 500. Upon reading the teachings of this specification, those with ordinary skill in the art will now understand that, under appropriate circumstances, considering such issues as advances in technology, user preference, etc., other arrangements, such as locking portions in the channel which releasably capture the sliders when the supports are approaching vertical, multiple locking heights, continuously variable locking heights, the supports being independently lockable such that the rail may be held tilted at an angle, the supports locking at an angle during use, powered supports being held at an angle during use, etc., may suffice.

Preferably, the lower (proximal) ends of extendable supports 540 are pivotally mounted within base channel 542, as shown. Preferably, each extendable support 540 is pivotally mounted within base channel 542 at pivot 545, as shown. Preferably, pivot 545 is adapted to rotate extendable support 540 with a single degree of freedom.

Preferably, each extendable support 540 comprises at least one rotator 557 adapted to generate at least one rotational force usable to assist in lifting extendable support 540 during deployment, as shown. Preferably, rotator 557 comprises at least one spring 559, as shown. Spring 559 is preferably positioned around pivot 545, as shown. Preferably, spring 559 is adapted to apply an opposing force to the interior of the adjacent telescoping section 555 and at least one fixed element, preferably base channel 542, as shown.

Preferably, boundary rail 530 comprises at least one internal channel 535, as shown, in which slider 550 is movably captured. Preferably, slider 550 is adapted to horizontally translate within channel 535 as tailgate extender 500 is raised or lowered. To assist slider 550 in freely moving within channel 535, slider 550 preferably comprises at least one friction-reducing wheel 541, most preferably a set of wheels 541, as shown. Preferably, pairs of wheels 541 are rotatably mounted to the distal end of extendable supports 540 by end fixture 560, as shown. Preferably, such pairs of wheels 541 are spaced to fit within internal channel 535 such that slider 550 may slide along the length of internal channel 535 without becoming disengaged from internal channel 535. Upon reading the teachings of this specification, those with ordinary skill in the art will now understand that, under appropriate circumstances, considering such issues as advances in technology, user preference, etc., other arrangements, such as bearings, other sliding arrangements, motorized supports, actuated supports, hydraulic supports, scissors-type collapsible supports, accordion-type collapsible supports, etc., may suffice.

Preferably, at least one end fixture 560 of slider 550 comprises slide positioner 561, as shown. Preferably, slide positioner 561 is adapted to releasably fix the position of slider 550 relative to boundary rail 530, as shown. Preferably, slide positioner 561 comprises a spring-loaded wheel adapted to roll along the upper interior surface of internal channel 535. Preferably, internal channel 535 is adapted to releaseably capture slide positioner 561 at a preset point and position, as shown. More specifically, preferably, internal channel 535 is adapted to releaseably capture slide positioner 561 within channel recess 563, as shown. Preferably, channel recess 563 comprises at least one user accessible release button 567 adapted to allow the user to release slide positioner 561 from channel recess 563.

Preferably, telescoping sections 555 are interlock by button lock 556, as shown. Preferably, button lock 556 engages aperture 558 when telescoping sections 555 are fully extended. Upon reading the teachings of this specification, those with ordinary skill in the art will now understand that, under appropriate circumstances, considering such issues as advances in technology, user preference, etc., other locking mechanisms, such as twist-locks, ratchets, clamps, multiple holes permitting multiple heights, etc., may suffice. Furthermore, upon reading the teachings of this specification, those with ordinary skill in the art will now understand that, under appropriate circumstances, considering issues such as designer preference, cost, etc., other locking arrangements, such as, for example, combining the locking of extendable supports with the locking of sliders using a single point of user control, etc., may suffice.

Boundary rails 530 of extended length (such as rear rail portion 530c) preferably comprise multiple extendable supports 540, as shown. It is preferred that adjacent sliders 550 of extendable supports 540 be coupled by coordinators 564 to assist in coordinating the movement of multiple extendable supports 540 during deployment and stowing, as shown. Preferably, coordinators 564 comprise at least one coordinator bar 565, preferably two coordinator bars 565, rotatably engaged on wheel pivots 541a of wheels 541, as shown.

Preferably, each extendable supports 540 comprises at least one telescopic assister, more preferably, at least one gas-charged spring 566, as shown. Preferably, gas-charged spring 566 is adapted to support, at least partially, the weight of the moving assemblies of tailgate extender 500, thus assisting the user in raising and lowering boundary rail 530. Preferably, gas-charged spring 566 is located within telescoping sections 555, as shown. Preferably, gas-charged spring 566 is operably coupled to end fixture 560 and pivot 545, as shown. Preferred gas-charged spring assemblies suitable for use as gas-charged spring 566 are available from the SUSPA Corporation (www.suspa-inc.com).

Figure 27:
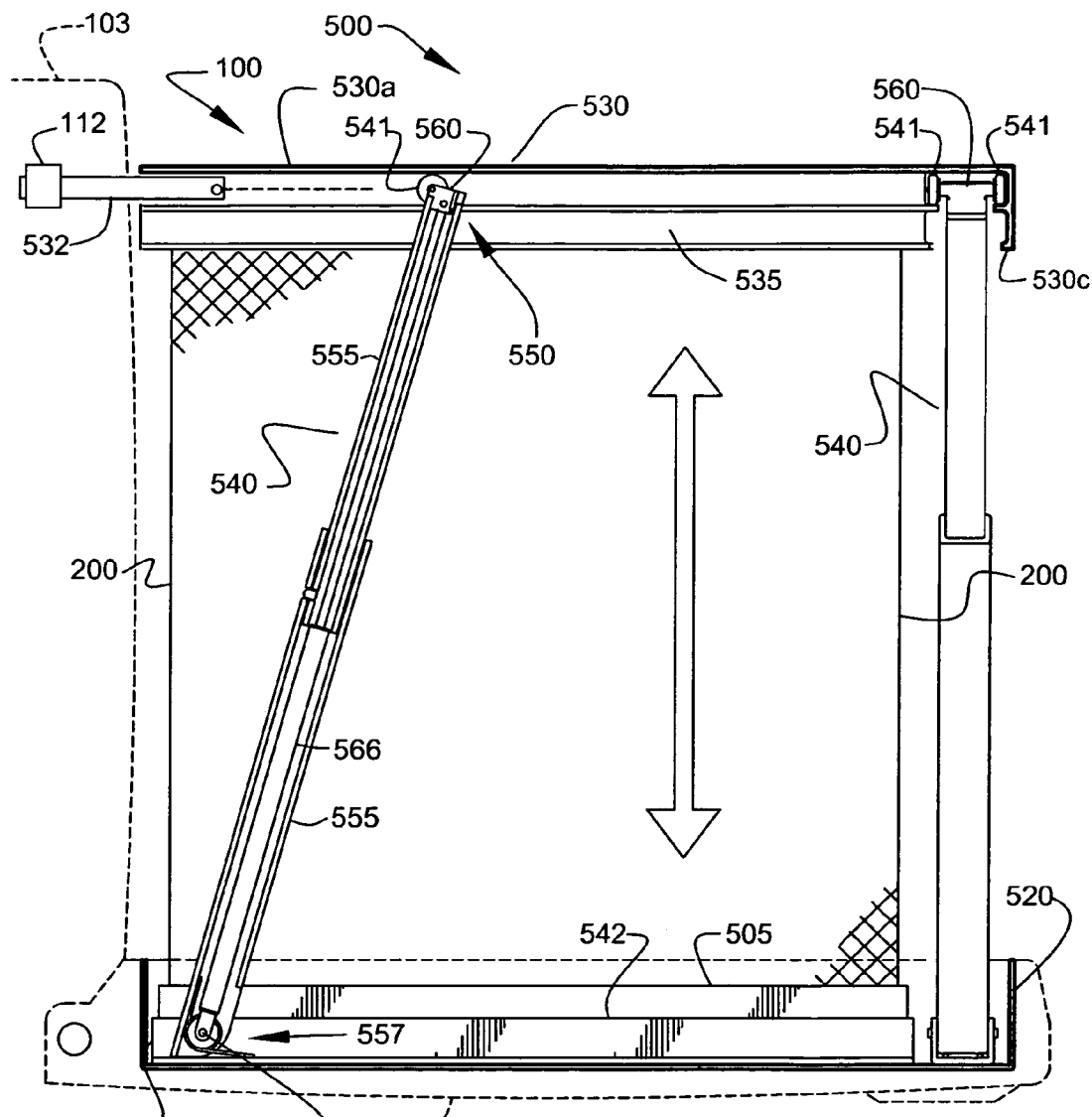
FIG. 27 shows the sectional view 27—27 of FIG. 20, illustrating the tailgate extender in a partially extended position.

FIG. 27 shows the sectional view 27—27 of FIG. 20, illustrating the tailgate extender in a partially extended position. Typically, first side-rail portion 530a and second side-rail portion 530b of boundary rail 530 are proportionally shorter in length relative to rear rail portion 530c. Preferably, first side-rail portion 530a and second side-rail portion 530b of boundary rail 530 are supported by a single extendable supports 540 for this reason. Upon reading the teachings of this specification, those with ordinary skill in the art will now understand that, under appropriate circumstances, considering issues such as vehicle manufacturer, make, model, etc., other support arrangements, such as, for example, utilizing multiple supports, etc., may suffice.

Preferably, boundary rail 530 comprises rail extenders 532, as shown. Preferably, rail extenders 532 moveably extend from boundary rail 530 to engage at least one fixed element of cargo bed 103, most preferably U-channel 112 mounted to cargo bed 103, as shown. Preferably, rail extenders 532 are adapted to releasably support/couple the deployed boundary rail 530 on cargo bed 103, thus providing additional structural stability to tailgate extender 500. Upon reading the teachings of this specification, those with ordinary skill in the art will now understand that, under appropriate circumstances, considering such issues as advances in technology, user preference, etc., other arrangements, such as rail extenders that unfold from the rail, rail extenders that attach to the truck, rail extending chains, the use of multiple extenders, etc., may suffice.

Figure 28:
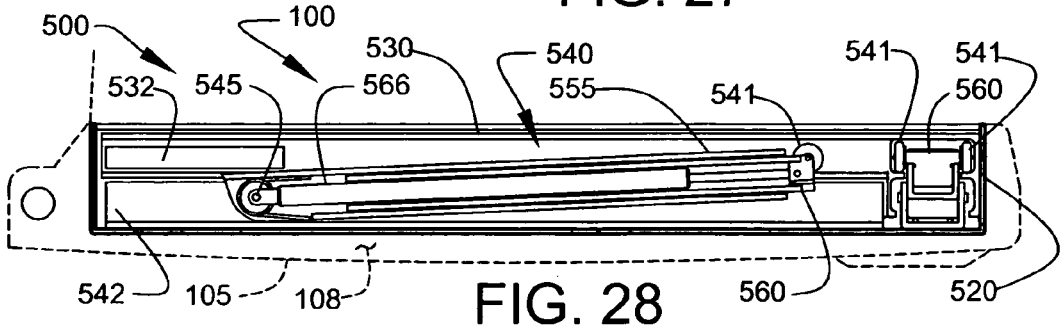
FIG. 28 shows the sectional view 27—27 of FIG. 20 illustrating the tailgate extender in a stowed position.

FIG. 28 shows the sectional view 27—27 of FIG. 20 illustrating the tailgate extender in a stowed position. FIG. 29 shows an enlarged sectional view of the sectional view 27—27 of FIG. 20 illustrating the tailgate extender in a stowed position. FIG. 28 and FIG. 29 further illustrate the preferred arrangements of tailgate extender 500, specifically, that tailgate extender 500 is adapted to be retractably stored within first storage compartment 520, and that first storage compartment 520 is adapted to be mounted substantially within interior cavity 108 of tailgate 105, as shown. Preferably, internal channel 535 is adapted to lower to a position substantially covering and encasing support assembly 539, as shown. Upon reading the teachings of this specification, those with ordinary skill in the art will now understand that, under appropriate circumstances, considering such issues as advances in technology, user preference, etc., other cross-sectional shapes, such as novelty shaped, shaped to match the theme of the truck, thin and flexible cable with no channel (instead threaded through the ends of the supports), etc., may suffice.

FIG. 30 shows the sectional view 30—30 of FIG. 20 illustrating tailgate extender 500 in a stowed position. Preferably, retractor 505 is rigidly mounted within first storage compartment 520, closely adjacent to support assembly 539, as shown. Preferably, cargo netting 200 is attached to boundary rail 530 utilizing attachers 220, such as, for example, hook and loop fasteners, as shown. Upon reading the teachings of this specification, those with ordinary skill in the art will now understand that, under appropriate circumstances, considering such issues as advances in technology, user preference, etc., other attachers, such as hooks and grommets, snaps, magnets, clips, clamps, permanent attachment, etc., may suffice. Preferably, retractor 505 is adapted to feed out cargo netting 200 as boundary rail 530 is raised, and to internally store cargo netting 200 as boundary rail 530 is lowered. Preferably, retractor 505 is adapted to continuously tension cargo netting 200 during deployment.

Preferably, cargo netting 200 and retractor 505 comprise commercially available components. Retractor assemblies suitable for use as cargo netting 200 and retractor 505 is the model JD03OMA line of products available from Carefree of Colorado, Broomfield, Colo., USA.

Preferably, cover 544 is adapted to protect the interior contents of second storage compartment 543, as shown. Upon reading the teachings of this specification, those with ordinary skill in the art will now understand that, under appropriate circumstances, considering issues such as the nature of the stored materials, etc., other cover arrangements, such as, for example, including with the cover, weather-proof seals, security locks, secondary access doors, etc., may suffice. Preferably, cover 544 comprises at least one extendable cover portion 588 adapted to cover such at least one first storage section, as shown. Preferably, extendable cover portion 588 comprises a sliding panel situated within slot cavity 553 of cover 544, as shown. Preferably, cover 544 comprises both side and rear extendable cover portion 588 adapted to cover substantially the entire first storage compartment 520. Upon reading the teachings of this specification, those with ordinary skill in the art will now understand that, under appropriate circumstances, considering issues such as cover thickness, cover material, etc., other extendable cover arrangements, such as, for example, fold-down extensions, tonneau-style flexible covers, etc., may suffice.

Preferably, tailgate extender system 100 is provided to consumers either as a feature originally installed within truck 104 by the truck manufacturer, or as an aftermarket component mountable to tailgate 105. As an aftermarket component, tailgate extender system 100 is preferably adapted to be mountable to tailgate 105 without substantial modifications. Upon reading the teachings of this specification, those with ordinary skill in the art will now understand that, under appropriate circumstances, considering issues such as vehicle manufacturer, make, model, etc., other mounting arrangements, such as, for example, providing application specific mounting accessories, such as, additional reinforcing members, filler plates, face panels, gate actuators, etc., may suffice.

FIG. 31A shows a front view of accessory cross bar 570, according to the preferred
  e) embodiment of FIG. 19. FIG. 31B shows the sectional view 31B—31B of FIG. 31A. Preferably, tailgate extender 500 further comprises accessory cross bar 570, as shown. Preferably, accessory cross bar 570 comprises at least one first bar coupler 572 adapted to couple accessory cross bar 570 to a first extendable support 540, and at least one second bar coupler 574 adapted to couple accessory cross bar 570 to at least one second extendable support 540, as shown (see also FIG. 19). Preferably, first bar coupler 572 and second bar coupler 574 comprise at least one link 576 adapted to link first bar coupler 572 and second bar coupler 574, as shown. Thus, accessory cross bar 570 preferably functions to assist positioning of long cargo 102 during transport. Preferably, accessory cross bar 570 is especially useful in supporting cargo of extended length such as pipes, stick lumber, etc. Preferably, first bar coupler 572 and second bar coupler 574 each comprise a clamping assembly 578, preferably adapted to adjustably clamp first bar coupler 572 and second bar coupler 574 to a respective telescoping section 555, as shown. Preferably, clamping assembly 578 comprises a deformable sleeve sized to fit over telescoping sections 555, as shown. Preferably, a threaded tightener 584 is used to compress (deform) clamping assembly 578 about telescoping section 555, as shown.

Preferably, first bar coupler 572 and second bar coupler 574 are pivotally mounted to link 576 at pivots 580, as shown. Preferably, link 576 is constructed using a pair of telescoping sections 582, preferably comprising interfitting tubes, preferably square tube members that allow the length of link 576 to be slidably adjusted, as shown.

Figure 32:
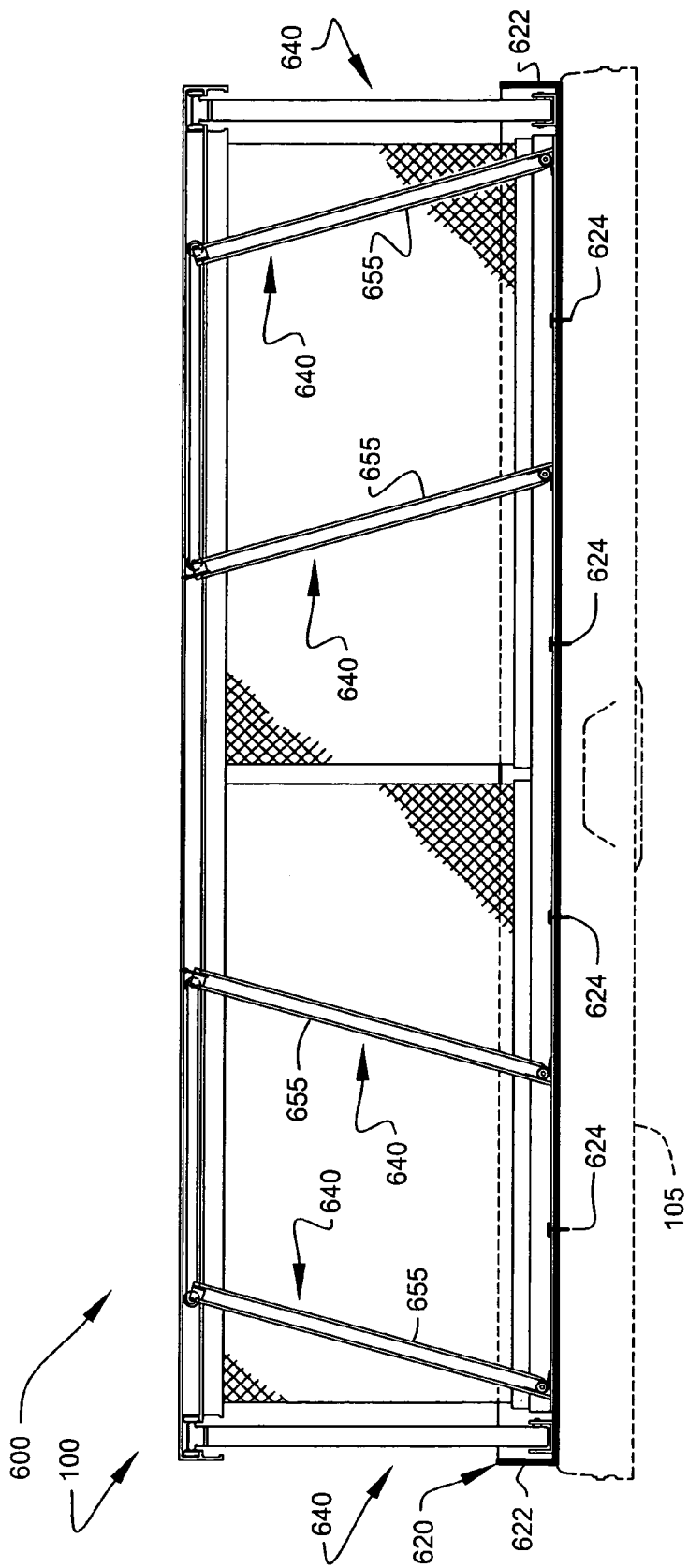
FIG. 32 shows a front sectional view illustrating a tailgate extender of the tailgate extender system according to another preferred embodiment of the present invention.

FIG. 32 shows a front sectional view illustrating tailgate extender 600 of tailgate extender system 100 according to another preferred embodiment of the present invention. Preferably, tailgate extender 600 relates generally to embodiments of tailgate extender system 100 applied in the aftermarket to vehicles as received from an OEM (original equipment manufacturer) source. Preferably, tailgate extender 600 is substantially similar in structure and arrangement to that of tailgate extender 500, however; tailgate extender 600 is modified such that first storage compartment 620 is mountable to the exterior of tailgate 105, as shown.

Preferably, tailgate extender 600 requires little or no modification to the vehicle during installation. Preferably, tailgate extender 600 is surface mounted to tailgate 105 using mechanical fasteners 624, as shown. Preferably, external sides 622 of storage compartment 620 are modified to comprise a suitable finished appearance. Preferably, to reduce the stowed thickness of tailgate extender 600, each extendable support 640 comprise a one-piece (non-telescoping) tube 655, as shown. Upon reading the teachings of this specification, those of ordinary skill in the art will now understand that, under appropriate circumstances, considering such issues as user preference, intended use, etc., other mounting arrangements, such as mounting the system in a semi-recessed manner, etc., may suffice.

Figure 33:
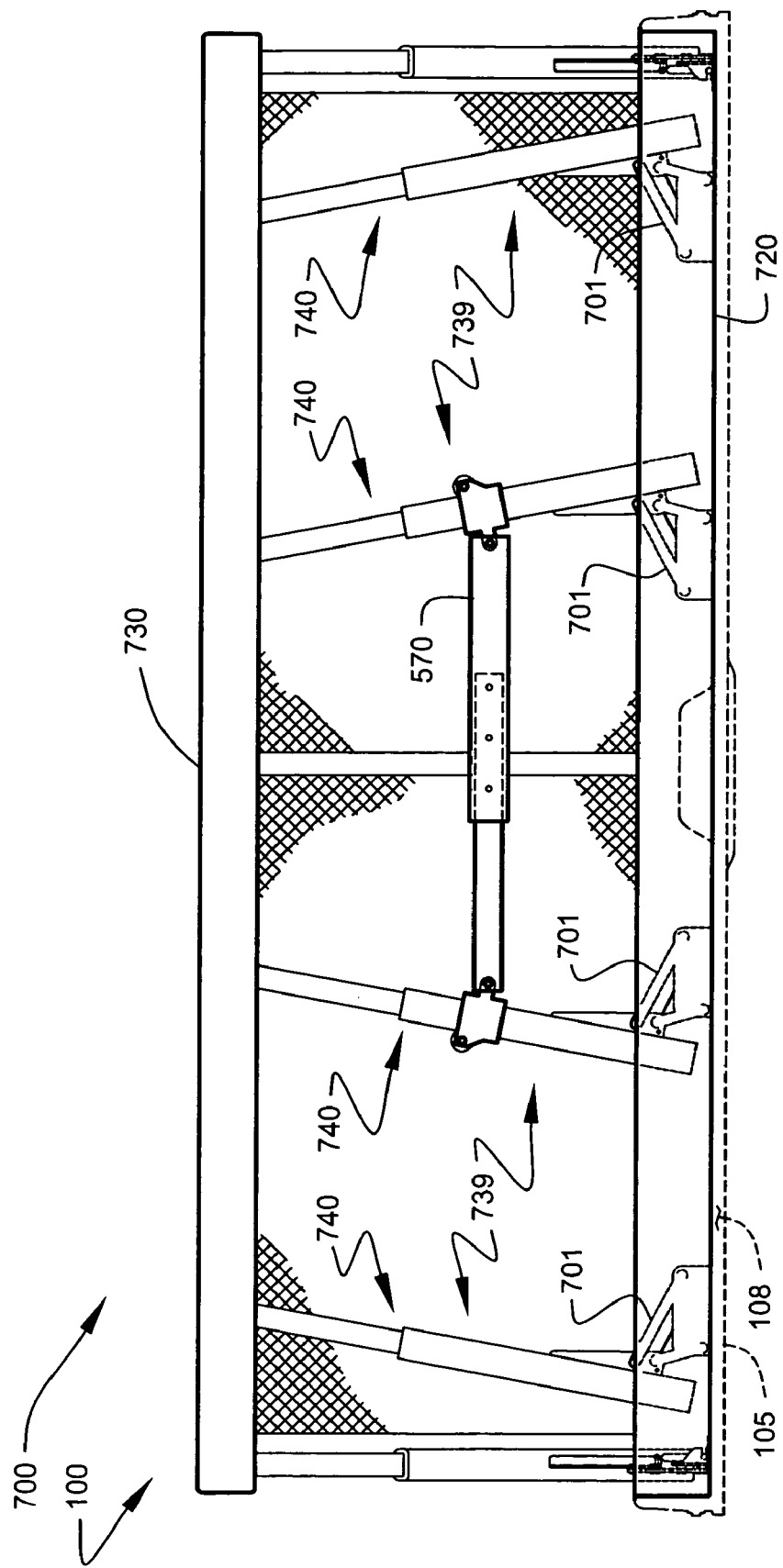
FIG. 33 shows a front view illustrating a tailgate extender of the tailgate extender system according to an alternate preferred embodiment of the present invention.
Figure 34:
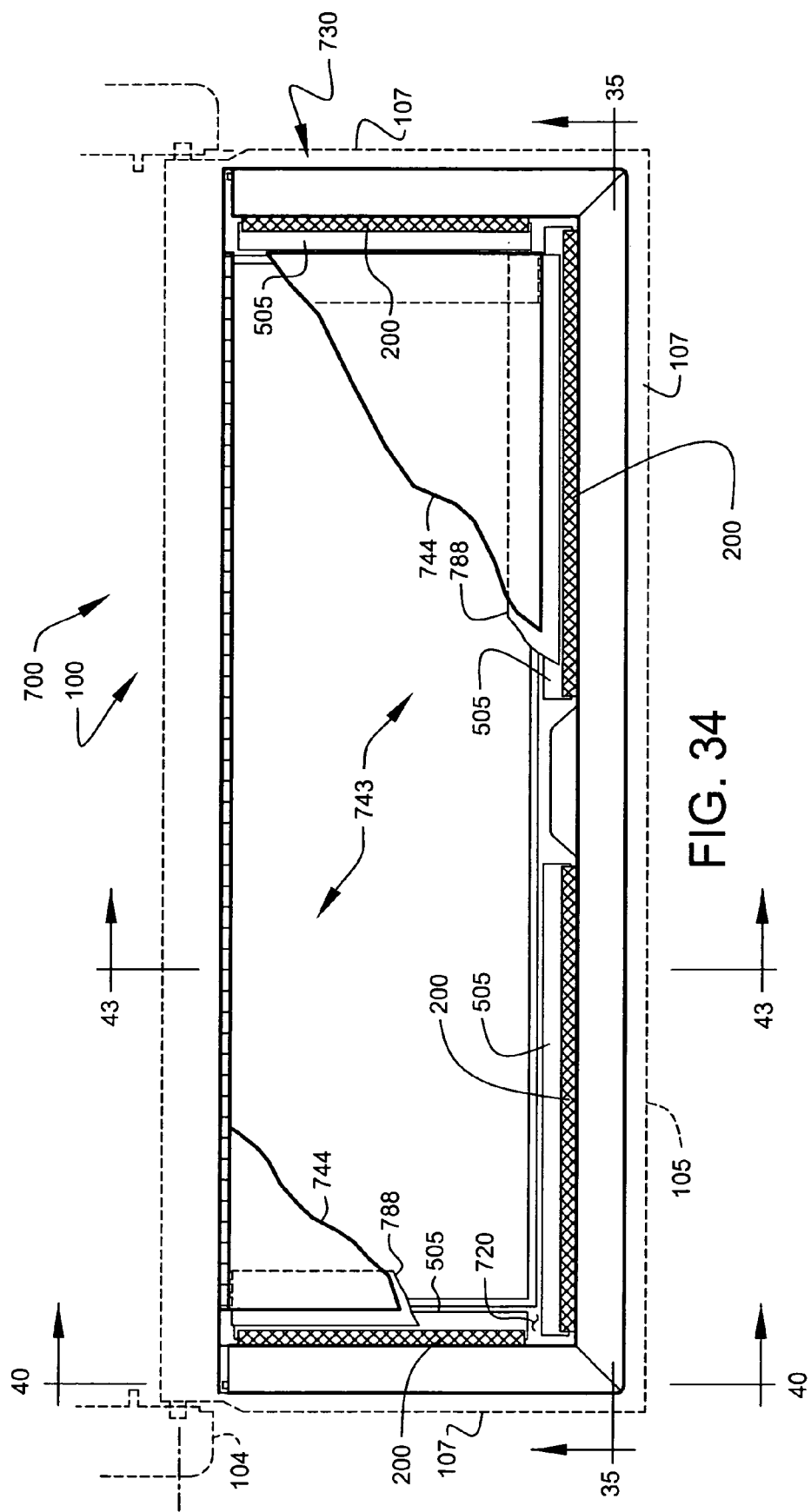
FIG. 34 shows a top view of the tailgate extender, according to the preferred embodiment of FIG. 33.

FIG. 33 shows a front view illustrating tailgate extender 700 of tailgate extender system 100 according to an alternate preferred embodiment of the present invention. FIG. 34 shows a top view of tailgate extender 700, according to the preferred embodiment of FIG. 33. FIG. 35 shows the sectional view 35—35 of FIG. 34 illustrating tailgate extender 700 in a raised (deployed) position. FIG. 36 shows the sectional view 35—35 of FIG. 34 illustrating tailgate extender 700 in a lowered (stowed) position.

Preferably, tailgate extender 700 is substantially similar in structure and arrangement to that of tailgate extender 500, however; tailgate extender 700 is modified such that the pivot connection of each extendable support 740 comprises double pivot hinge 701, as shown. Preferably, tailgate extender 700 is adapted to be retractably stored within first storage compartment 720, as shown. Preferably, first storage compartment 720 is mounted substantially within interior cavity 108 of tailgate 105.

Preferably, tailgate extender 700 comprises boundary rail 730 movably supported by arrangement of telescoping support bars identified herein as extendable support assembly 739, as shown. Preferably, boundary rail 730 comprises a substantially rigid, substantially continuous member, adapted to retain cargo 102 within cargo bed 103. Preferably, boundary rail 730 is of sufficient size and strength to withstand impact from cargo shifting in the cargo bed of truck 104.

Preferably, extendable support assembly 739 comprises a set of extendable supports 740, as shown. Preferably, extendable supports 740 comprise a set of length adjustable bars, adapted to raise and lower boundary rail 730 along a substantially vertical path. In addition, extendable supports 740 preferably function to assist in retaining cargo 102 within cargo bed 103.

Preferably, tailgate extender 700 is adapted to deploy to at least one user-settable height, as shown. Upon reading the teachings of this specification, those with ordinary skill in the art will now understand that, under appropriate circumstances, considering such issues as advances in technology, user preference, etc., other arrangements, such as multi-part rails, the tailgate extender extending above the tailgate internal surface in storage, other heights, multiple adjustable heights, etc., may suffice.

Preferably, boundary rail 730, extendable supports 740, and first storage compartment 720 are constructed of at least one, preferably a combination of materials having an application-appropriate level of durability and weather resistance. Preferably, tailgate extender 700 substantially comprises metal, most preferably steel and/or aluminum. Upon reading the teachings of this specification, those with ordinary skill in the art will now understand that, under appropriate circumstances, considering such issues as advances in technology, user preference, etc., other materials, such as plastic, composite materials, wood, ceramics, combinations of materials, etc., may suffice.

Figure 37:
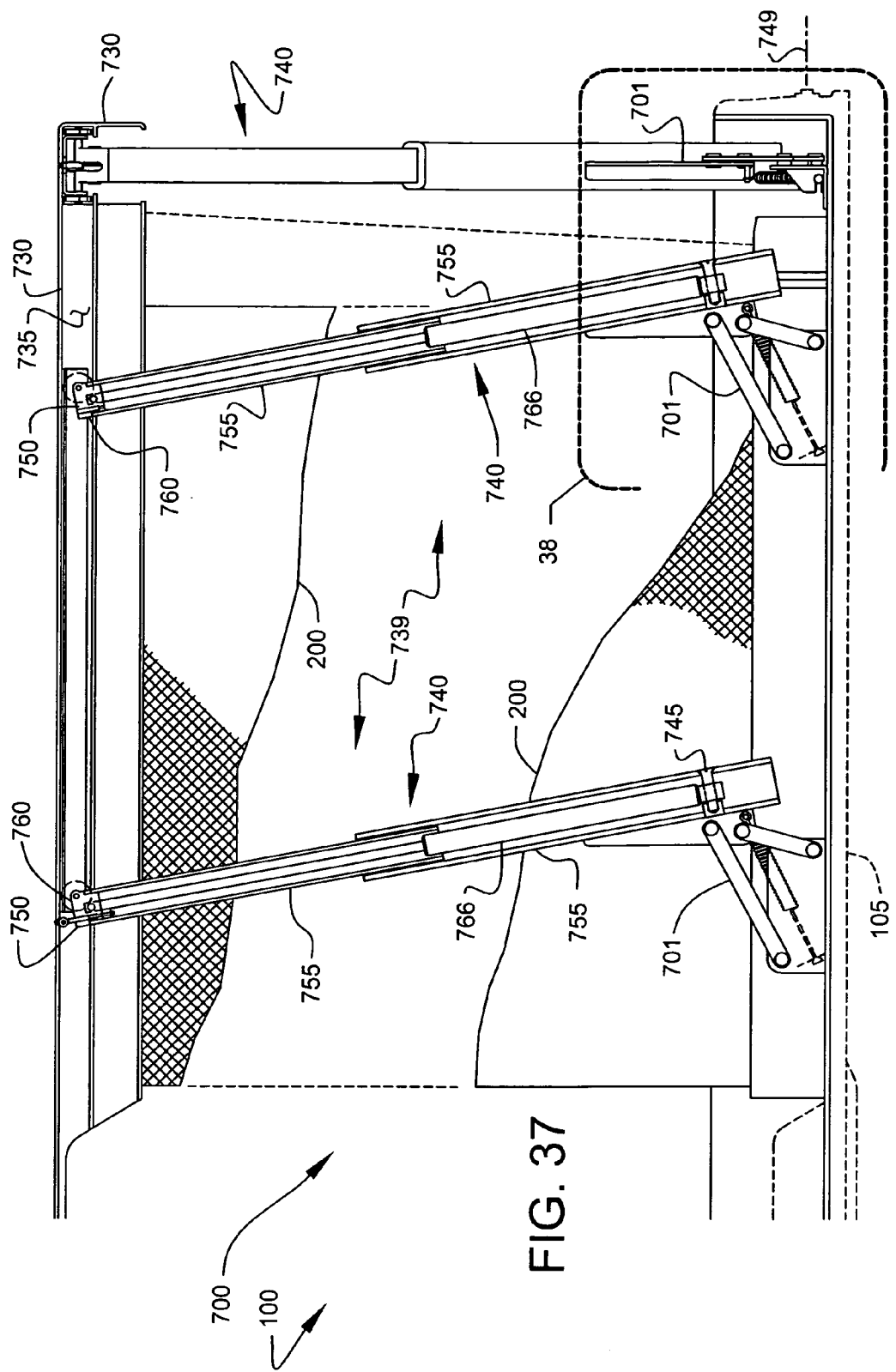
FIG. 37 shows the detailed sectional view 37 of FIG. 35.
Figure 38:
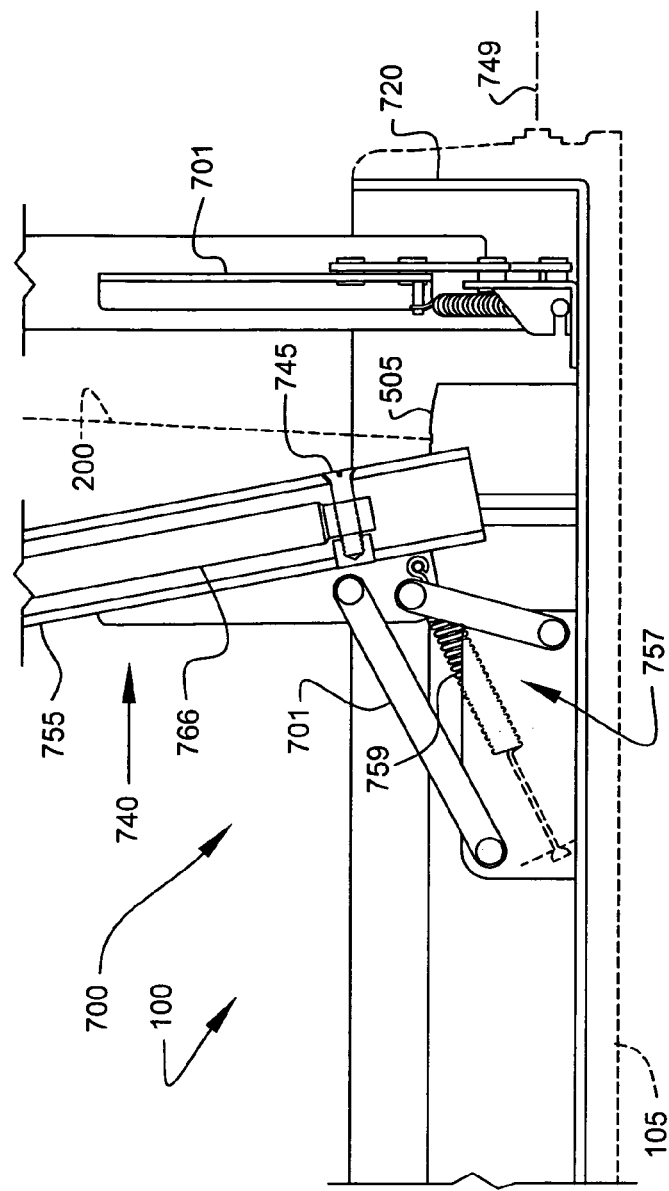
FIG. 38 shows the detailed sectional view 38 of FIG. 37.
Figure 39:
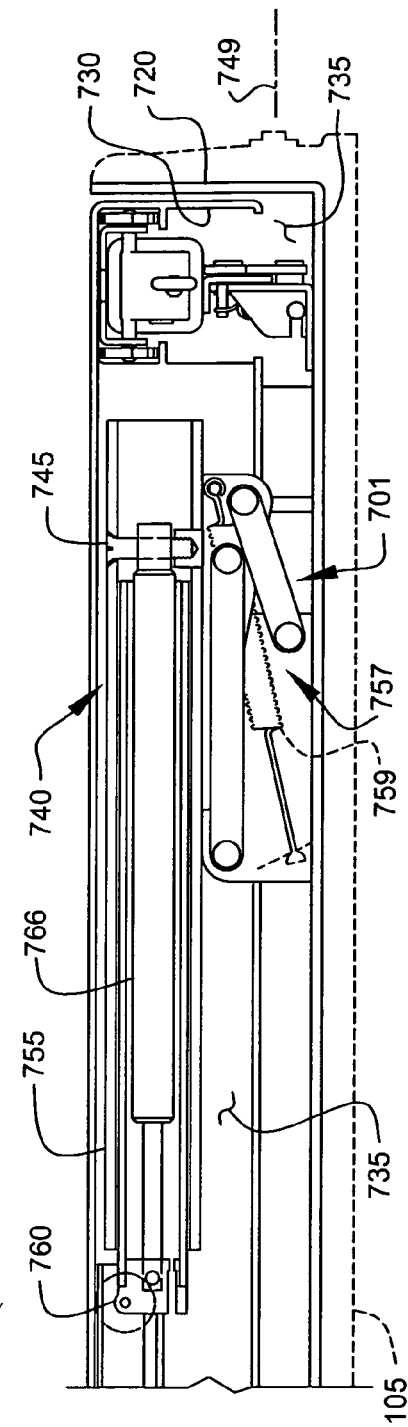
FIG. 39 shows the detailed sectional view 39 of FIG. 36.

FIG. 37 shows the detailed sectional view 37 of FIG. 35. FIG. 38 shows the detailed sectional view 38 of FIG. 37. FIG. 39 shows the detailed sectional view 39 of FIG. 36. Preferably, each extendable support 740 is constructed using a pair of telescoping sections 755, preferably comprising interfitting tubes, preferably square tube members, which permit the length of extendable support 740 to be slidably adjusted for length, as shown. Preferably, extendable supports 740 are adjustable to at least one preselected length (preferably corresponding to the height of the vehicle bed), as shown. Preferably, when extendable supports 740 are extended to the preset length, telescoping sections 755 releasably interlock into a fixed position and remain extended, as shown (at least embodying herein the step of releasably locking such at least one barrier in at least one extended position). During deployment, extendable supports 740 preferably swing through a near 90-degree arc, as shown. Preferably, in the locked position, extendable supports 740 are oriented near vertical, relative to open tailgate 105, when fully extended and ready for use, as shown. Preferably, the angular rotation of extendable supports 740 is limited to less than 90-degrees relative to pivot axis 749, as shown. This preferred limit of rotation arranges extendable supports 740 to allow a smooth downward angular rotation of extendable supports 740 during the lowering and stowing of tailgate extender 700.

Preferably, the lower (proximal) ends of extendable supports 740 are pivotally mounted to the base of first storage compartment 720, as shown. Preferably, each extendable support 740 is pivotally mounted within first storage compartment 720 using double pivot hinge 701, as shown. Preferably, double pivot hinge 701 is adapted to rotate extendable support 740 with a single degree of freedom.

Preferably, each double pivot hinge 701 comprises at least one rotator 757 adapted to generate at least one rotational force usable to assist in lifting extendable support 740 during deployment, as shown. Preferably, rotator 757 comprises at least one spring 759, as shown. Double pivot hinges preferably suitable for use as double pivot hinge 701 are available from Hardware Source, Inc. of San Diego, Calif. (www.hardwaresource.com).

Preferably, boundary rail 730 comprises at least one internal channel 735, as shown, in which slider 750 is movably captured. Preferably, slider 750 is adapted to translate (horizontally) within channel 735 as tailgate extender 700 is raised or lowered. The structures and arrangements of boundary rail 730 and slider 750 are preferably identical to those described for tailgate extender 500, above.

Preferably, each extendable supports 740 comprise at least one telescopic assister, more preferably, at least one gas-charged spring 766, as shown. Preferably, gas-charged spring 766 is adapted to support, at least partially, the weight of the moving assemblies of tailgate extender 700, thus assisting the user in raising and lowering boundary rail 730.

Preferably, gas-charged spring 766 is situated within telescoping sections 755, as shown. Preferably, gas-charged spring 766 is operably coupled to end fixture 760 and spring mount 745, as shown. Preferably, spring mount 745 comprises a threaded pin removably disposed within a telescoping section 755, as shown. Preferred gas-charged spring assemblies suitable for use as gas-charged spring 766 are available from the SUSPA Corporation (www.suspa-inc.com).

Figure 40:
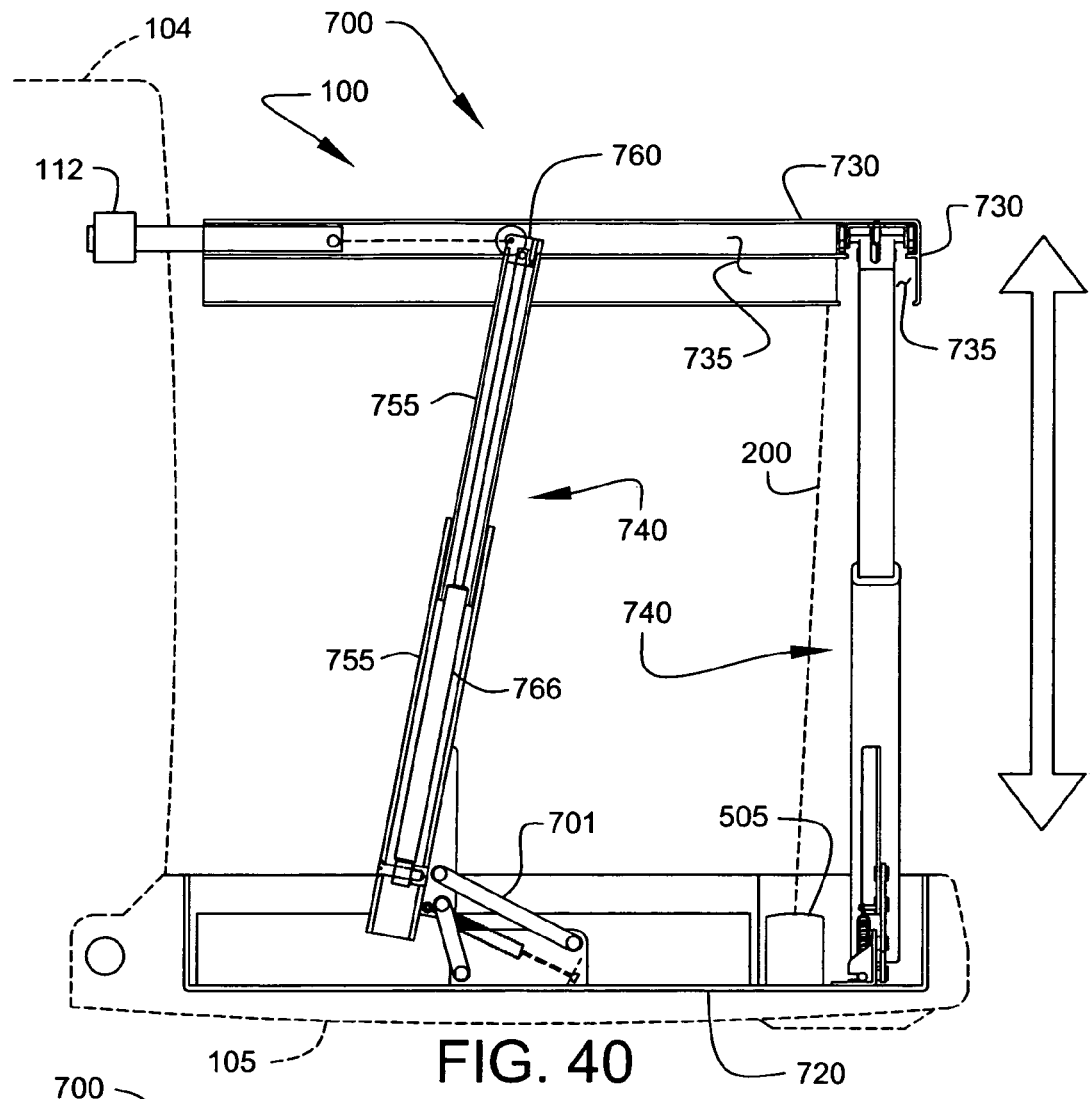
FIG. 40 shows the sectional view 40—40 of FIG. 34, illustrating the tailgate extender in an extended position.
Figure 41:
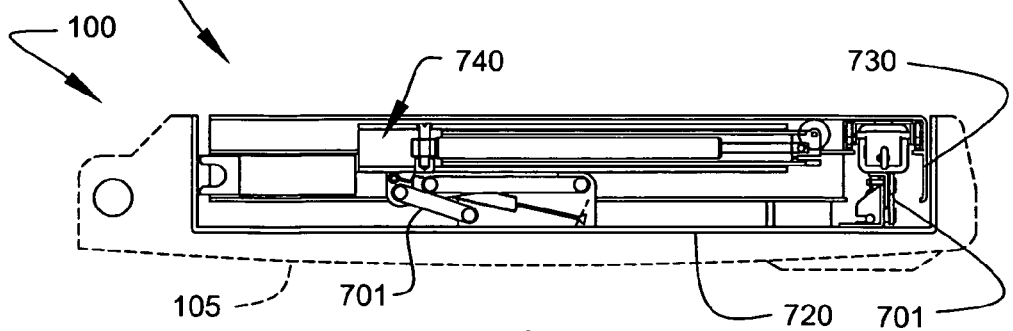
FIG. 41 shows the sectional view 41—41 of FIG. 34, illustrating the tailgate extender in a stowed position.
Figure 42:
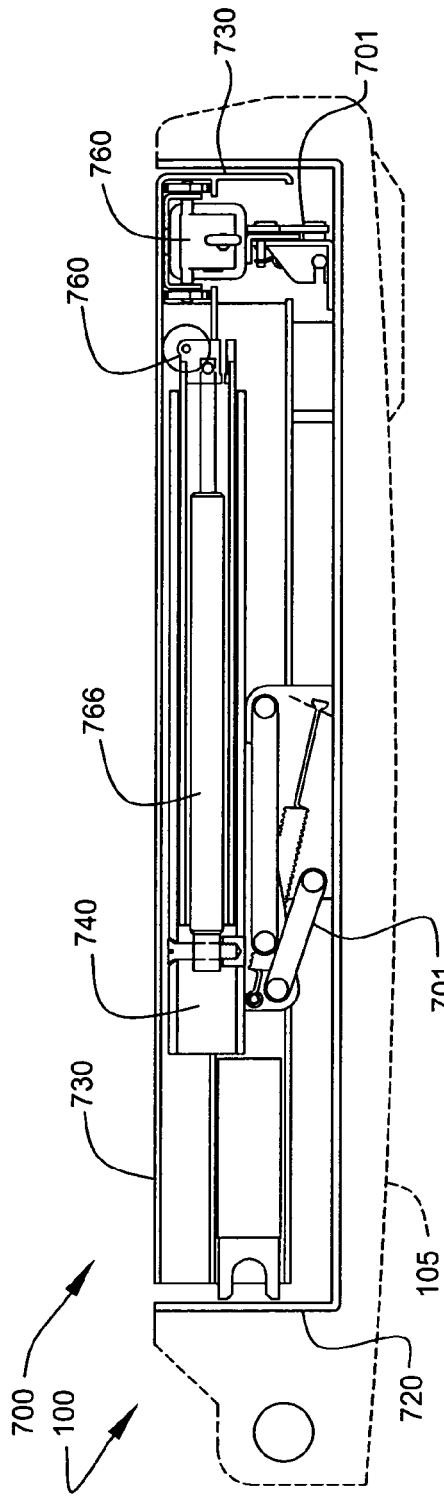
FIG. 42 shows an enlarged view of the sectional view 42—42 of FIG. 41, illustrating the tailgate extender in a stowed position.

FIG. 40 shows the sectional view 40—40 of FIG. 34, illustrating tailgate extender 700 in an extended position. FIG. 41 shows the sectional view 41—41 of FIG. 34, illustrating tailgate extender 700 in a stowed position. FIG. 42 shows an enlarged view of the sectional view 42—42 of FIG. 41, illustrating tailgate extender 700 in a stowed position. FIG. 40 through FIG. 42 further illustrates preferred structures and arrangements of tailgate extender 700. As previously noted, with the exception of the use of double pivot hinges 701 and modified mounting of gas-charged spring 766, the preferred construction and operation of tailgate extender 700 is substantially identical to that of tailgate extender 500, as described above.

Figure 43:
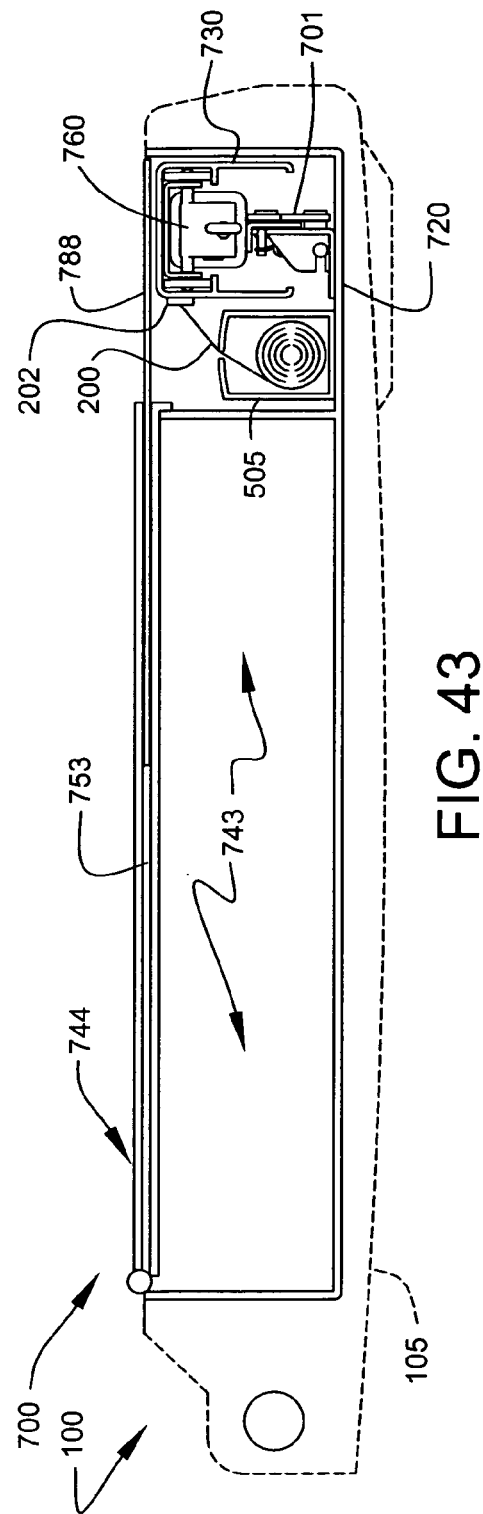
FIG. 43 shows an enlarged view of the sectional view 43—43 of FIG. 41, illustrating the tailgate extender in a stowed position.

FIG. 43 shows an enlarged view of the sectional view 43–43 of FIG. 41, again illustrating tailgate extender 700 in a stowed position. Preferably, cover 744 is adapted to protect the interior contents of second storage compartment 743, as shown. Upon reading the teachings of this specification, those with ordinary skill in the art will now understand that, under appropriate circumstances, considering issues such as the nature of the stored materials, etc., other cover arrangements, such as, for example, including with the cover, weather-proof seals, security locks, secondary access doors, etc., may suffice. Preferably, cover 744 comprises at least one extendable cover portion 788 adapted to cover such at least one first storage section, as shown. Preferably, extendable cover portion 788 comprises a sliding panel situated within slot cavity 753 of cover 744, as shown. Preferably, cover 744 comprises both side and rear extendable cover portion 788 adapted to cover substantially the entire first storage compartment 720. Upon reading the teachings of this specification, those with ordinary skill in the art will now understand that, under appropriate circumstances, considering issues such as cover thickness, cover material, etc., other extendable cover arrangements, such as, for example, fold-down extensions, tonneau-style flexible covers, etc., may suffice.

Preferably, cargo netting 200 and retractor 505 again comprise commercially available retractor assemblies such as the JD03OMA line of products available from Carefree of Colorado, Broomfield, Colo., USA. Means of attaching cargo netting 200 to boundary rail 730 are preferably equivalent to those described for tailgate extender 500.

Figure 44:
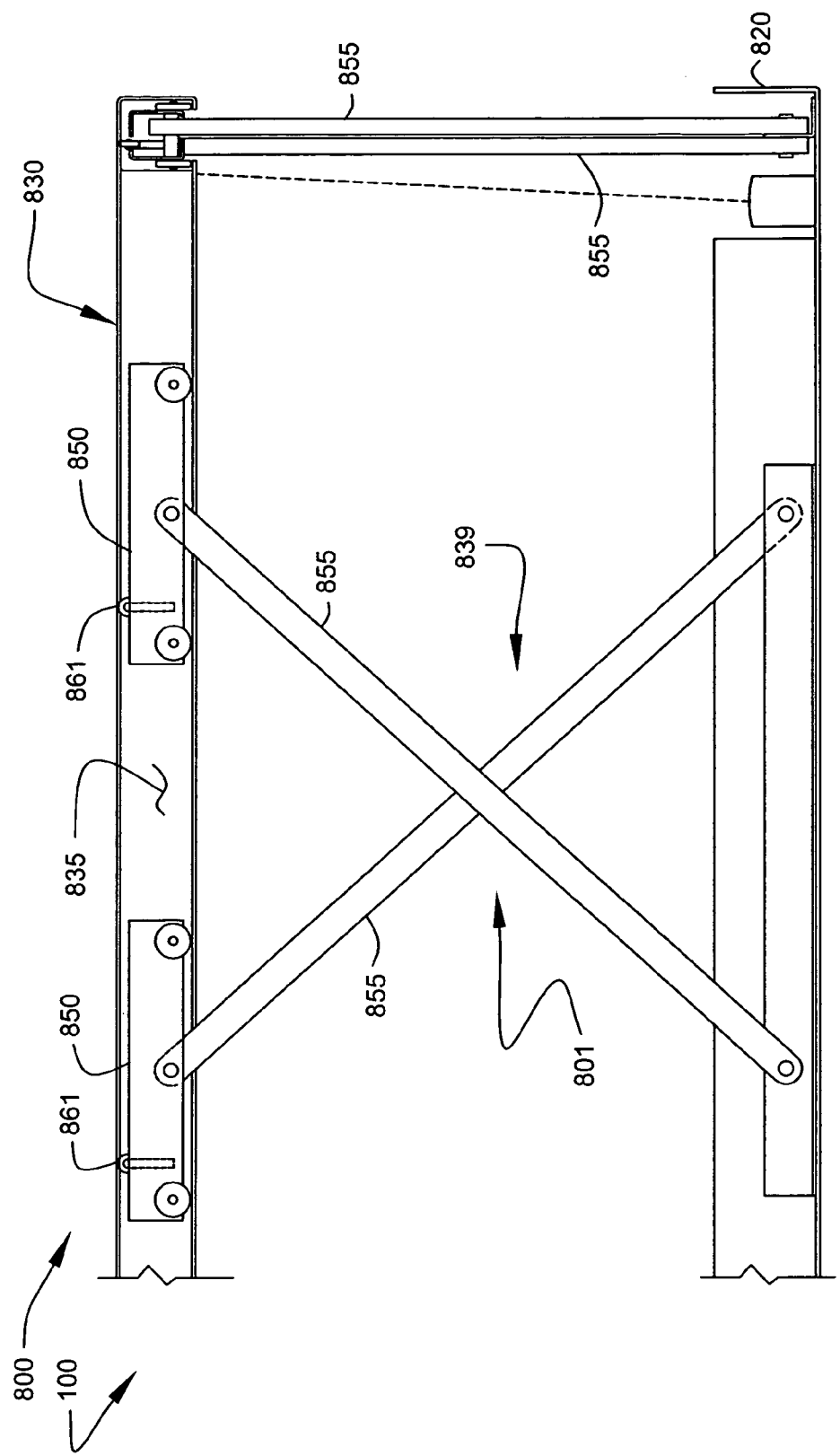
FIG. 44 shows a partial sectional view illustrating a tailgate extender of the tailgate extender system according to another preferred embodiment of the present invention.

FIG. 44 shows a partial sectional view illustrating tailgate extender 800 of tailgate extender system 100 according to another preferred embodiment of the present invention. Preferably, tailgate extender 800 is substantially similar in structure and arrangement to that of tailgate extender 500, however; tailgate extender 800 is modified such that support assembly 839 comprises scissor support 801, as shown. Preferably, tailgate extender 800 is adapted to be retractably stored within first storage compartment 820, as shown.

Preferably, tailgate extender 800 comprises boundary rail 830 movably supported by arrangement of diagonal support bars 855, as shown. Preferably, diagonal support bars 855 are adapted to raise and lower boundary rail 830 along a substantially vertical path.

Preferably, tailgate extender 800 is adapted to deploy to at least one user-settable height, as shown. Upon reading the teachings of this specification, those with ordinary skill in the art will now understand that, under appropriate circumstances, considering such issues as advances in technology, user preference, etc., other arrangements, such as multi-part rails, the tailgate extender extending above the tailgate internal surface in storage, other heights, multiple adjustable heights, etc., may suffice.

Preferably, the lower ends of diagonal support bars 855 are pivotally mounted to the base of first storage compartment 820, as shown. Preferably, the upper ends of diagonal support bars 855 are coupled to sliders 850, as shown. Preferably, sliders 850 translate horizontally along the interior of internal channel 835 thus allowing the angular rotation of diagonal support bars 855. Preferably, each slider 850 comprises a spring loaded slide positioner 861, as shown. Preferably, slide positioner 861 is substantially equivalent in structure and function to slide positioner 561 of tailgate extender 500.

Figure 45:
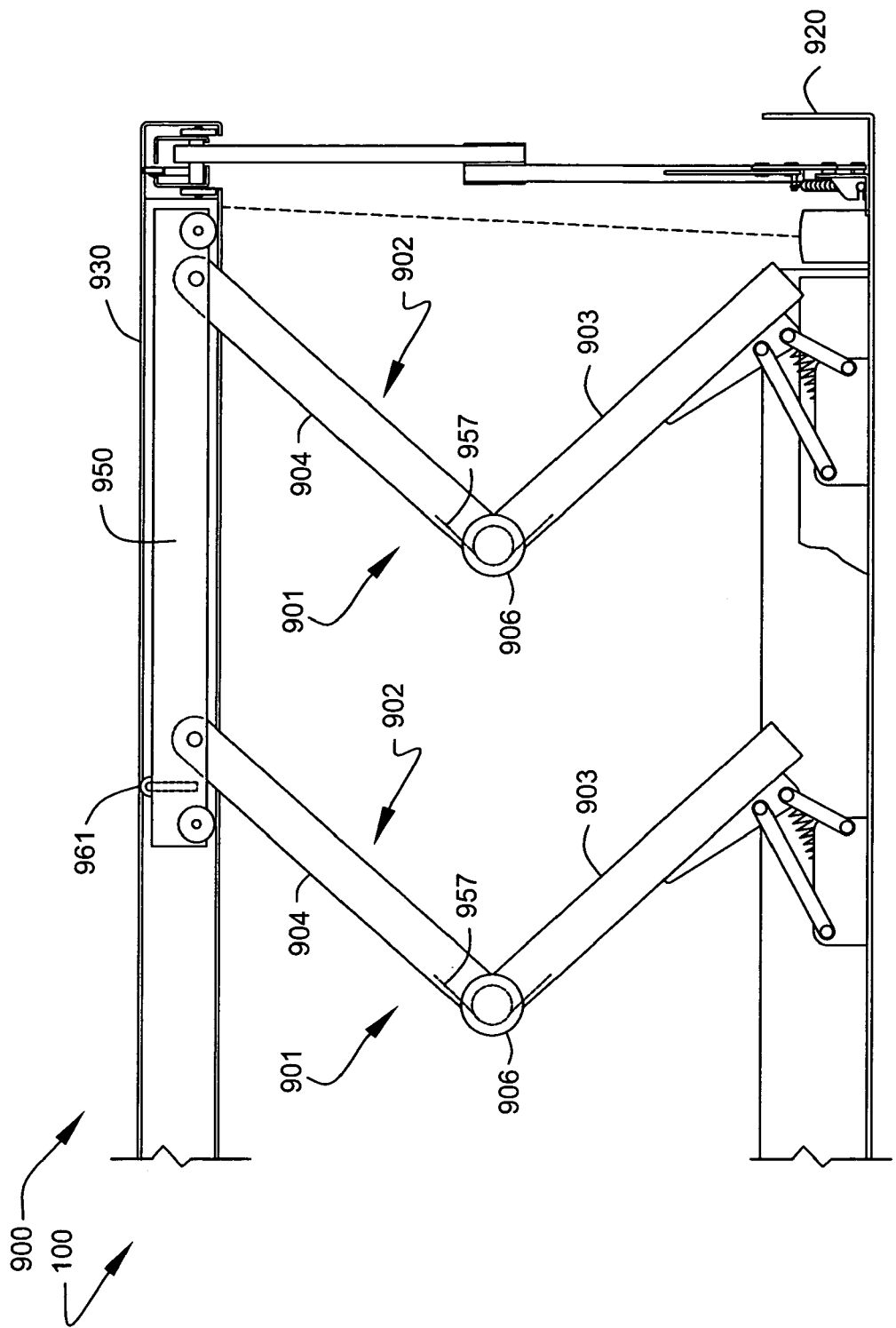
FIG. 45 shows a partial sectional view illustrating a tailgate extender of the tailgate extender system according to another preferred embodiment of the present invention.

FIG. 45 shows a partial sectional view illustrating tailgate extender 900 of tailgate extender system 100 according to another preferred embodiment of the present invention. Preferably, tailgate extender 900 is substantially similar in structure and arrangement to that of tailgate extender 700, however; tailgate extender 900 is modified such that support assembly 939 comprises articulated support 901, as shown. Preferably, tailgate extender 900 is adapted to be retractably stored within first storage compartment 920, as shown.

Preferably, tailgate extender 900 comprises boundary rail 930 movably supported by articulated support system 901, as shown. Preferably, articulated support system 901 is adapted to raise and lower boundary rail 930 along a substantially vertical path.

Preferably, articulated support system 901 comprises a set of articulated supports 902, as shown. Preferably, each articulated support 902 comprises at least one first support arm 903 pivotally coupled to first storage compartment 920, and at least one second support arm 904 pivotally coupled to slider 950, as shown. Preferably, first support arm 903 and second support arm 504 are pivotally coupled at articulated joint 906, as shown. Preferably, articulated joint 906 is adapted provide a single degree of movement between first support arm 903 and second support arm 904. Preferably, articulated joint 906 comprises an internal rotator 957 (preferably a spring) adapted to generate at least one rotational force usable to assist in lifting articulated support system 901 and boundary rail 930 during deployment, as shown.

Preferably, tailgate extender 900 is adapted to deploy to at least one user-settable height, as shown. Preferably, sliders 950 translate horizontally along the interior of internal channel 935. Preferably, each slider 950 comprises a spring loaded slide positioner 961, as shown. Preferably, slide positioner 961 is substantially equivalent in structure and function to slide positioner 561 of tailgate extender 500.

Figure 46:
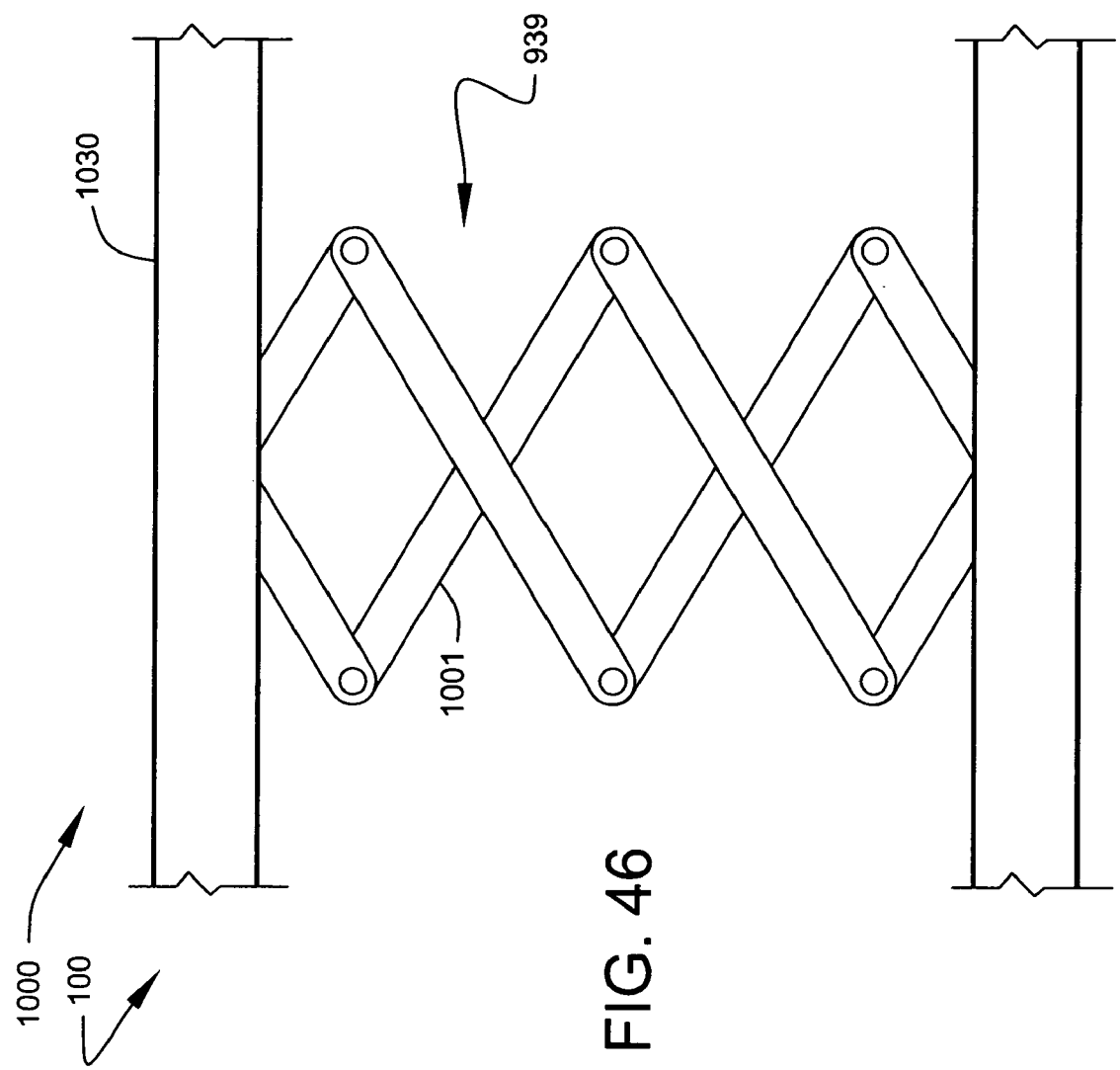
FIG. 46 shows a partial sectional view illustrating a tailgate extender of the tailgate extender system according to another preferred embodiment of the present invention.

FIG. 46 shows a partial sectional view illustrating tailgate extender 1000 of the tailgate extender system 100 according to another preferred embodiment of the present invention. Preferably, tailgate extender 1000 is a hybrid combination similar in structure and arrangement to that of tailgate extender 800 and tailgate extender 900, as shown. Preferably, tailgate extender 1000 is modified such that support assembly 1039 comprises a multi-arm scissor-type support 1001, as shown. Preferably, support assembly 1039 is adapted to assist in raising and lowering boundary rail 1030 along a substantially vertical path.

Figure 47:
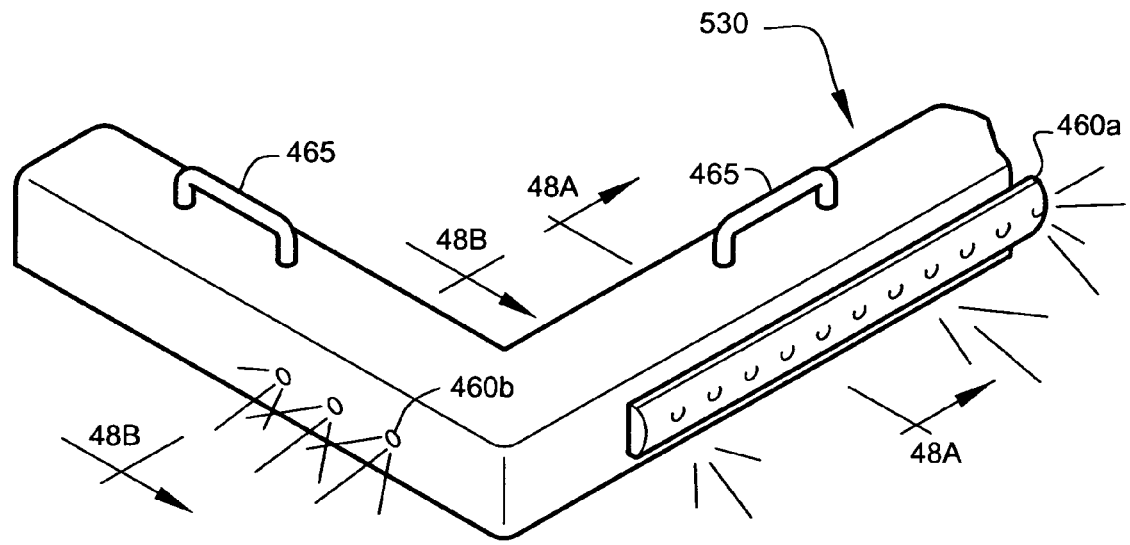
FIG. 47 shows a partial perspective view illustrating illumination components of the tailgate extender system according to another preferred embodiment of the present invention.
Figures 48A, 48B:
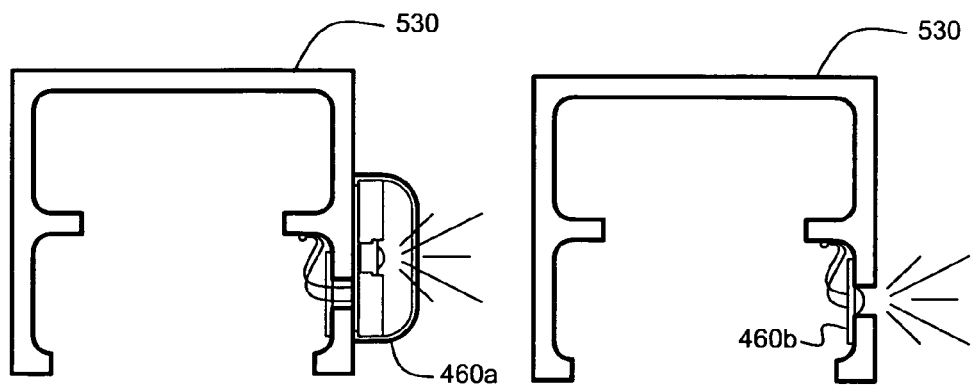
FIG. 48A shows an enlarged view of the sectional view 48A—48A of FIG. 47.
FIG. 48B shows an enlarged view of the sectional view 48B—48B of FIG. 47.

FIG. 47 shows a partial perspective view illustrating illumination and functional components of tailgate extender system 100 according to additional preferred embodiments of the present invention. FIG. 48A shows an enlarged view of the sectional view 48A—48A of FIG. 47. FIG. 48B shows an enlarged view of the sectional view 48B—48B of FIG. 47. Preferably, each boundary rail embodiment of tailgate extender system 100 is adaptable to receive indicator light assembly 460, as shown. For clarity, the depicted boundary rail of FIG. 47 is identified herein as boundary rail 530. It should be noted that in the present discussion, boundary rail 530 is representative of each of the above-described boundary rail embodiments of tailgate extender system 100. Preferably, indicator light assembly 460 functions as a secondary running light, brake light, turn signal, and/or hazard light (for added safety). Preferably, indicator light assembly 460 comprises an array of super high-intensity light emitting diodes (LED), as shown. Preferably, the LED array is housed within a one-piece, weather proof, polymer housing, mounted to the exterior face of boundary rail 530, as shown. This externally mounted arrangement is identified herein as indicator light assembly 460a. More preferably, indicator light assembly 460 comprises an LED strip mounted within boundary rail 530. This internally mounted arrangement is identified herein as indicator light assembly 460b, as shown. Preferably, indicator light assembly 460 comprises an application appropriate length of between about 36 inches and 72 inches. Preferably, indicator light assembly 460 is adapted to electrically couple with the taillight wiring circuit of truck 104. More preferably, indicator light assembly 460 is adapted to plug directly into the standard four-prong towing harness of truck 104. NHSTA approved indicator light assemblies suitable for use as indicator light assembly 460 include commercially available products available from RECON Truck Accessories of Boca Raton, Fla. Upon reading the teachings of this specification, those of ordinary skill in the art will now understand that, under appropriate circumstances, considering such issues as user preference, intended use, etc., other lighting arrangements, such as custom lighting installations, multiple lighting devices, devices comprising flashers/motion effects, etc., may suffice.

In addition, preferred embodiments of the boundary rails comprise retractable "U"-bolts 465, as shown. Preferably, "U"-bolts 465 are provided as securing points for cargo straps and similar ties. Preferably, "U"-bolts 465 are retractably mounted within the upper face of boundary rail 530, as shown.

EMBODIMENTS

Tailgate 105 at least embodies herein tailgate means for providing at least one tailgate, having at least one inner surface and at least one outer surface, adapted to be hingedly connected to at least one truck bed. Tailgate 105 at least embodies herein at least one tailgate, having at least one inner surface and at least one outer surface, adapted to be hingedly connected to at least one truck bed.

Tailgate extender 101 at least embodies herein barrier means for assisting barring cargo from crossing at least one distal perimeter of said tailgate means when said tailgate means is connected to the at least one truck bed and lowered.

Storage compartment 120 at least embodies herein wherein said tailgate means comprises storage means for storing said barrier means when not in use. Storage compartment 120 at least embodies herein wherein said storage means is located substantially between said at least one inner surface and said at least one outer surface of said tailgate means.

Supports 140 at least embody herein wherein said barrier means comprises extender means for extending said barrier means substantially perpendicularly through said at least one inner surface. Support 140 at least embodies herein extendable support means for extendably supporting said rail means.

Rail 130 at least embodies herein rail means for railing.

Hinge 145 at least embodies herein first connector means for connecting said extendable support means to said tailgate means. Hinge 145 at least embodies herein at least one first connector adapted to connect said at least one extendable support to said at least one tailgate. Hinge 145 at least embodies herein wherein said at least one first connector comprises at least one hinge.

Slider 150 in conjunction with channel 135 at least embodies herein second connector means for connecting said extendable support means to said rail means.

Tailgate extender 101 at least embodies herein at least one barrier adapted to assist barring cargo from crossing at least one rear perimeter of said at least one tailgate when said at least one tailgate is connected to the at least one truck bed and lowered.

Storage compartment 120 at least embodies herein wherein said at least one tailgate comprises at least one storage compartment adapted to store said at least one barrier when not in use. Storage compartment 120 at least embodies herein wherein said at least one storage compartment is located substantially between said at least one inner surface and said at least one outer surface of said at least one tailgate.

Support 140 at least embodies herein wherein said at least one barrier comprises at least one extender adapted to extend said at least one barrier substantially perpendicularly through said at least one inner surface, wherein at least one extended barrier portion may be formed.

Gap rail 132 at least embodies herein at least one gap closer adapted to close at least one gap between such at least one extended barrier portion and such at least one truck bed. Gap rail 132 at least embodies herein wherein said at least one gap closer is retractably extendable from said at least one barrier.

Retractable storage compartment cover 300 at least embodies herein at least one cover adapted to cover said at least one storage compartment. Retractable storage compartment cover 300 at least embodies herein wherein said at least one cover is retractably storable within such at least one at least one tailgate.

Cargo netting 200 at least embodies herein at least one flexible barrier adapted to assist flexibly barring cargo from passing through said at least one barrier. Cargo netting 200 at least embodies herein at least one flexible restraint adapted to assist flexibly restraining cargo.

Retractor 205 at least embodies herein wherein said at least one flexible barrier is adapted to be stored within said at least one barrier. Retractor 205 at least embodies herein wherein said at least one flexible barrier is adapted to be stored within said at least one storage compartment.

Rail 130 at least embodies herein at least one rail adapted to substantially horizontally rail such at least one rear perimeter of said at least one tailgate when said at least one tailgate is connected to such at least one truck bed and lowered.

Support 140 at least embodies herein at least one extendable support adapted to extendably vertically support said at least one rail. Support 140 at least embodies herein wherein said extendable support means comprises at least one telescoping bar.

Slider 150 in conjunction with channel 135 at least embodies herein at least one second connector adapted to connect said at least one extendable support to said at least one rail. Slider 150 at least embodies herein at least one slider adapted to slide said at least one extendable support within said at least one channel.

Channel 135 at least embodies herein wherein said at least one second connector comprises at least one channel within said at least one rail.

Retractor 205 at least embodies herein wherein said at least one rigid barrier comprises at least one retractor adapted to retract said at least one flexible restraint means for storage. Retractor 205 at least embodies herein wherein said at least one retractor is located within said at least one rigid barrier.

Tailgate extender 500, tailgate extender 600, tailgate extender 700, tailgate extender 800, tailgate extender 900, and illustrating tailgate extender 1000 each at least embody herein at least one barrier adapted to assist barring cargo from crossing the at least one perimeter edge.

First storage compartment 520, first storage compartment 620, first storage compartment 720, first storage compartment 820, and first storage compartment 920 each at least embody herein at least one first storage section adapted to assist storage of such at least one barrier, in at least one stowed position.

Support assembly 539, support assembly 639, support assembly 739, support assembly 839, support assembly 939 each at least embody herein at least one conveyer adapted to convey such at least one barrier between such at least one stowed position and at least one deployed position, and at least one extendable support adapted to extendably support such at least one boundary rail.

Second storage compartment 543 and second storage compartment 743 each at least embody herein at least one second storage section adapted to store at least one storable object.

Cover 544 and cover 744 each at least embody herein at least one cover adapted to cover such at least one second storage section.

Extendable cover portion 588 and extendable cover portion 788 each at least embody herein at least one extendable cover portion adapted to cover such at least one first storage section.

Internal channel 535, internal channel 735, internal channel 835, and internal channel 935 each at least embody herein at least one substantially linear interior channel.

Pivot 545 and double pivot hinge 701 each at least embody herein at least one first connector adapted to pivotally connect such at least one extendable support to such at least one first storage section.

Pivots 541a of fixtures 560 of slider 550, slider 750, slider 850, and slider 950 at least embody herein at least one second connector adapted to pivotally connect such at least one extendable support to such at least one boundary rail.

Rotator 557 and spring 559 at least embody herein at least one rotator adapted to rotate such at least one extendable support about such at least one first connector, and wherein such at least one rotator comprises at least one spring.

Wheels 541 at least embody herein at least one friction reducer adapted to assist in reducing friction between such at least one substantially linear interior channel and such at least one slider wherein such at least one friction reducer comprises at least one wheel.

Slide positioner 561, slide positioner 861, and slide positioner 961 each at least embody at least one positional fixer adapted to fix the position of such at least one slider relative to such at least one boundary rail.

Telescoping sections 555 and telescoping sections 755 each at least embody wherein such extendable support means comprises at least one telescoping bar adapted to telescopically adjust the linear distance between such at least one first connector and such at least one second connector.

Button lock 556 at least embodies herein at least one releasable lock adapted to releasably lock such at least one telescoping bar in at least one telescopic position.

Coordinator bar 565 at least embodies herein at least one coordinator adapted to coordinates the operation of such at least one first such at least one extendable support and such at least one second at least one extendable support; and wherein such at least one coordinator comprises at least one link adapted to link each such at least one slider of such at least one first such at least one extendable support and such at least one second at least one extendable support.

Accessory cross bar 570 at least embodies herein at least one cargo management bar adapted to manage the storage and transport of such cargo within the at least one truck bed.

First bar coupler 572 and second bar coupler 574 at least embody herein at least one first bar coupler adapted to couple such at least one cargo management bar to at least one first such at least one extendable support, and at least one second bar coupler adapted to couple such at least one cargo management bar to at least one second such at least one extendable support.

Link 576 at least embodies herein at least one link adapted to link such at least one first bar coupler and such at least one second bar coupler.

Rail extenders 532 at least embody herein at least one gap closer adapted to close at least one gap between such at least one boundary rail and such at least one truck bed.

Indicator light assembly 460 at least embodies herein at least one illuminator adapted to provide visually discernable illumination.

Clearance notch 551 at least embodies herein at least one clearance indentation.

Although applicant has described applicant's preferred embodiments of this invention, it will be understood that the broadest scope of this invention includes modifications such as diverse shapes, sizes, and materials. Such scope is limited only by the below claims as read in connection with the above specification. Further, many other advantages of applicant's invention will be apparent to those skilled in the art from the above descriptions and the below claims.

What is claimed is:

1. A truck tailgate extender system comprising:
 a) tailgate having, when in raised position, an internal surface, said tailgate connected to a truck bed; and
 b) a barrier to assist barring cargo from crossing a rear perimeter of said tailgate when said tailgate is in lowered position;
 c) wherein said barrier, when unextended in a stowed position, lies in a first plane along said internal surface of said tailgate and, when extended in an extended position, lies in a second plane parallel to, and spaced perpendicularly from, the first plane; and
 d) at least one extender to extend said barrier substantially perpendicularly from the stowed position in the first plane to the extended position in the second plane;
 e) wherein, when said tailgate is in the lowered position, movement of said at least one extender provides vertical motion to said barrier between the stowed position and the extended position.

2. The truck tailgate extender system according to claim 1 further comprising:
 a) at least one gap closer to close at least one gap between said barrier in the extended position and the truck bed;
 b) wherein said at least one gap closer is retractably extendable from said barrier.

3. The truck tailgate extender system according to claim 1 further comprising at least one storage compartment to store said barrier when in the stowed position.

4. The truck tailgate extender system according to claim 3 further comprising:
 a) at least one flexible barrier to assist flexibly barring the cargo from passing across said barrier;
 b) wherein said at least one flexible barrier is stored substantially within said at least one storage compartment.

5. The truck tailgate extender system according to claim 1 wherein said barrier comprises:
 a) at least one rail to substantially horizontally rail the rear perimeter of said tailgate when said tailgate is connected to the truck bed and lowered; and
 b) at least one extendable support to extendably vertically support said at least one rail;
 c) at least one first connector to connect said at least one extendable support to said tailgate; and
 d) at least one second connector to connect said at least one extendable support to said at least one rail;
 e) wherein said at least one first connector comprises at least one hinge.

6. The truck tailgate extender system according to claim 5 wherein said at least one extendable support comprises at least one telescoping bar.

7. A truck tailgate extender system comprising:
 a) a barrier to assist barring cargo from crossing a rear perimeter of a tailgate when the tailgate is in lowered position, the tailgate having, when in raised position and connected to a truck bed, an internal surface;
 b) wherein said barrier, when unextended in a stowed position, lies in a first plane along the internal surface of the tailgate and, when extended in an extended position, lies in a second plane parallel to, and spaced perpendicularly from, the first plane; and
 c) at least one conveyor to convey said barrier substantially perpendicularly from the stowed position in the first plane to the extended position in the second plane;
 d) wherein, when said tailgate is in the lowered position, movement of said at least one conveyor provides vertical motion to said barrier between the stowed position and the extended position.

8. The truck tailgate extender system according to claim 7 further comprising:
 a) at least one first storage section to store said barrier in the stowed position; and
 b) at least one second storage section to store at least one storable object.

9. The truck tailgate extender system according to claim 8 further comprising:
 a) at least one cover to cover said at least one second storage section;
 b) wherein said at least one cover comprises at least one extendable cover portion to cover said at least one first storage section; and c) wherein said at least one extendable cover portion is extendably positionable relative to said at least one cover.

10. The truck tailgate extender system according to claim 8 further comprising:
 a) at least one flexible barrier to assist in flexibly barring cargo from moving past said barrier;
 b) wherein said at least one flexible barrier comprises at least one retractor to retract said at least one flexible barrier for storage; and
 c) wherein said at least one flexible barrier is storable within said at least one first storage section.

11. The truck tailgate extender system according to claim 8 wherein:
 a) said barrier comprises at least one boundary rail to bound the rear perimeter of the tailgate;
 b) said at least one boundary rail comprises at least one substantially linear interior channel;
 c) said at least one conveyer comprises at least one extendable support adapted to extendably support said at least one boundary rail;
 d) said at least one extendable support comprises at least one first connector to pivotally connect said at least one extendable support to said at least one first storage section; and
 e) said at least one extendable support further comprises at least one second connector to pivotally connect said at least one extendable support to said at least one boundary rail.

12. The truck tailgate extender system according to claim 11 wherein:
 a) said at least one first connector comprises at least one rotator to rotate said at least one extendable support about said at least one first connector;
 b) said at least one rotator comprises at least one torque generator to generate at least one torque force;
 c) said at least one rotator is structured and arranged to apply the at least one torque force to said at least one extendable support; and
 d) application of the at least one torque force biases said at least one extendable support toward at least one rotation about said at least one first connector.

13. The truck tailgate extender system according to claim 11 wherein said at least one second connector comprises at least one slider to slide within said at least one substantially linear interior channel of said at least one boundary rail.

14. The truck tailgate extender system according to claim 11 wherein:
 a) said at least one extendable support comprises at least one telescoping bar to telescopically adjust a linear distance between said at least one first connector and said at least one second connector; and
 b) said at least one telescoping bar comprises at least one releasable lock to releasably lock said at least one telescoping bar in at least one telescopic position.

15. The truck tailgate extender system according to claim 14 wherein:
 a) said at least one extendable support further comprises at least one telescopic assister to assist telescopic adjustment of said at least one telescoping bar;
 b) said at least one telescopic assister comprises at least one gas-charged spring; and
 c) said at least one gas-charged spring is disposed substantially within said at least one telescoping bar.

16. The truck tailgate extender system according to claim 11 further comprising:
 a) at least one cargo management bar to manage the storage and transport of the cargo within the truck bed;
 b) wherein said at least one cargo management bar comprises
  i) at least one first bar coupler to couple said at least one cargo management bar to at least one first said at least one extendable support,
  ii) at least one second bar coupler to couple said at least one cargo management bar to at least one second said at least one extendable support, and
  iii) at least one link to link said at least one first bar coupler and said at least one second bar coupler;
 c) wherein said at least one link assists positioning of the cargo during storage and transport.

17. The truck tailgate extender system according to claim 11 further comprising:
 a) at least one gap closer to close at least one gap between said at least one boundary rail and the truck bed;
 b) wherein said at least one gap closer is retractably extendable from said at least one boundary rail.

18. The truck tailgate extender system according to claim 8 wherein said at least one first storage section and said at least one second storage section are each located substantially within at least one inner cavity of the tailgate.

19. The truck tailgate extender system according to claim 8 wherein said at least one first storage section and said at least one second storage section are each located substantially external of at least one inner cavity of the tailgate.

20. The truck tailgate extender system according to claim 11 wherein:
 a) said at least one boundary rail comprises at least one illuminator to provide visually discernable illumination; and
 b) said at least one illuminator is operatively coupled to at least one electrical circuit of the truck bed.

21. The truck tailgate extender system according to claim 7 wherein said barrier comprises a U-shaped member.

* * * * *

UNITED STATES PATENT AND TRADEMARK OFFICE
CERTIFICATE OF CORRECTION

| | | |
|---|---|---|
| PATENT NO. | : 7,182,380 B2 | Page 1 of 1 |
| APPLICATION NO. | : 11/361219 | |
| DATED | : February 27, 2007 | |
| INVENTOR(S) | : Rick A. Nagle | |

It is certified that error appears in the above-identified patent and that said Letters Patent is hereby corrected as shown below:

Column 27, line 55, "a) tailgate" should read -- a) a tailgate --

Signed and Sealed this

Twenty-sixth Day of June, 2007

JON W. DUDAS
*Director of the United States Patent and Trademark Office*